(12) United States Patent
Ohme et al.

(10) Patent No.: US 7,550,541 B2
(45) Date of Patent: Jun. 23, 2009

(54) RESIN COMPOSITION AND MOLDED ARTICLE, FILM AND FIBER EACH COMPRISING THE SAME

(75) Inventors: Hiroyuki Ohme, Nagoya (JP); Sadanori Kumazawa, Nagoya (JP); Jiro Kumaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/826,011

(22) Filed: Jul. 11, 2007

(65) Prior Publication Data

US 2007/0260019 A1 Nov. 8, 2007

Related U.S. Application Data

(62) Division of application No. 10/485,690, filed as application No. PCT/JP02/07838 on Aug. 1, 2002, now Pat. No. 7,268,190.

(30) Foreign Application Priority Data

| Aug. 3, 2001 | (JP) | 2001-236082 |
| Nov. 6, 2001 | (JP) | 2001-340948 |
| Jan. 24, 2002 | (JP) | 2002-014948 |
| Jan. 24, 2002 | (JP) | 2002-014949 |
| Feb. 7, 2002 | (JP) | 2002-030474 |

(51) Int. Cl.
C08J 3/00 (2006.01)
C08J 5/00 (2006.01)
C08L 59/00 (2006.01)
C08L 67/04 (2006.01)

(52) U.S. Cl. .................. 525/400; 524/593; 524/599; 562/589; 568/603

(58) Field of Classification Search .............. 525/400; 524/593, 599; 562/589; 568/603
See application file for complete search history.

(56) References Cited

U.S. PATENT DOCUMENTS

| 4,665,126 A | 5/1987 | Kusumgar et al. ............ 525/66 |
| 5,149,723 A | 9/1992 | Hayes ......................... 524/99 |
| 5,183,858 A | 2/1993 | Sasaki et al. ............... 525/308 |
| 5,290,858 A | 3/1994 | Sasaki et al. .................. 525/64 |
| 5,352,709 A | 10/1994 | Tarrant et al. .............. 521/84.1 |
| 5,470,944 A | 11/1995 | Bonsignore ................. 528/354 |
| 5,489,474 A | 2/1996 | Shinoda et al. ............. 428/343 |
| 5,518,730 A | 5/1996 | Fuisz .......................... 424/426 |
| 5,663,288 A | 9/1997 | Shinoda et al. ............. 528/354 |
| 5,741,332 A | 4/1998 | Schmitt ................... 623/23.64 |
| 5,817,343 A | 10/1998 | Burke ......................... 424/489 |
| 5,852,135 A | 12/1998 | Kanai et al. ................. 525/398 |
| 5,955,402 A | 9/1999 | Hirata et al. ................ 508/106 |
| 5,973,024 A | 10/1999 | Imashiro et al. ............. 523/124 |
| 6,025,309 A | 2/2000 | Falk et al. ................... 508/452 |
| 6,107,378 A | 8/2000 | Imashiro et al. ............. 524/195 |
| 6,121,033 A | 9/2000 | Tadros et al. ................ 435/198 |
| 6,153,129 A | 11/2000 | Herbert et al. .................. 264/5 |
| 6,200,347 B1 | 3/2001 | Anderson et al. ......... 623/16.11 |
| 6,214,940 B1 * | 4/2001 | Imashiro et al. ............. 525/399 |
| 6,245,849 B1 | 6/2001 | Morales et al. .............. 524/442 |
| 6,673,405 B2 | 1/2004 | Harashina .................. 428/35.7 |
| 6,692,728 B2 | 2/2004 | Weipert et al. ................ 424/59 |
| 7,268,190 B2 * | 9/2007 | Ohme et al. ................. 525/400 |

FOREIGN PATENT DOCUMENTS

| JP | 60-500576 A | 4/1985 |
| JP | 62-36451 A | 2/1987 |
| JP | 3-14856 | 1/1991 |
| JP | 5-43772 A | 2/1993 |
| JP | 05043772 A * | 2/1993 |
| JP | 5-148407 A | 3/1993 |
| JP | 6-65468 A | 3/1994 |
| JP | 6-184417 A | 7/1994 |
| JP | 9-316310 A | 12/1997 |
| JP | 11-80522 A | 3/1999 |
| JP | 2000-17153 A | 1/2000 |
| JP | 2000017153 A * | 1/2000 |
| JP | 2001-123055 A | 5/2001 |
| JP | 2003-138119 A | 5/2004 |
| JP | 02003138119 A | 5/2004 |
| WO | 84/03292 A1 | 8/1984 |

OTHER PUBLICATIONS

Nijenhuis, A.J. et al., "High molecular weight poly(L-lactide) and poly(ethylene oxide) blends: thermal characterization and physical properties," *Polymer*, vol. 37, No. 26, pp. 5849-5857, 1996.

Eguiburu, J.L. et al., "Blends of amorphous and crystalline polylactides with poly(methyl methacrylate) and poly(methyl acrylate): a miscibility study," *Polymer*, vol. 39, No. 26, pp. 6891-6897, 1998.

Machado, J.M. et al., "Miscible polyacetal-poly(cinyl phenol) blends: 2. Thermomechanical properties and morphology," *Polymer*, vol. 33, No. 4, pp. 760-766, 1992.

* cited by examiner

Primary Examiner—Timothy J Kugel
(74) Attorney, Agent, or Firm—Kubovcik & Kubovcik

(57) ABSTRACT

Disclosed are a resin composition comprising a polylactic acid resin and a polyacetal resin, and such a resin composition in which the polylactic acid resin and the polyacetal resin are kept miscible with each other. The resin composition has good moldability, workability, mechanical properties, heat resistance and transparency, and may be worked into moldings, films and fibers for practical use.

15 Claims, 1 Drawing Sheet

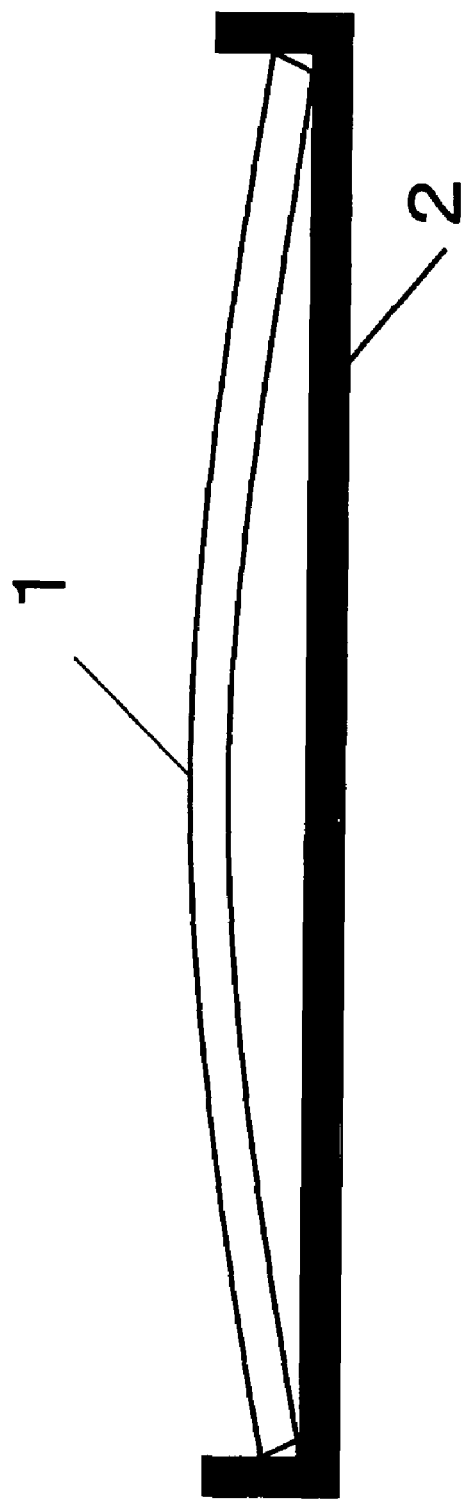

US 7,550,541 B2

RESIN COMPOSITION AND MOLDED ARTICLE, FILM AND FIBER EACH COMPRISING THE SAME

This application is a division of U.S. patent application Ser. No. 10/485,690 filed Feb. 3, 2004, now U.S. Pat. No. 7,268,190, which is a 371 of PCT/JP02/07838 filed Aug. 1, 2002, which claims priority of Japanese patent application Nos. 2001-236082 tiled Aug. 3, 2001, 2001-340948 filed Nov. 6, 2001, 2002-014948 filed Jan. 24, 2002, 2002-014949 filed Jan. 24, 2002, and 2002-030474 filed Feb. 7, 2002, each of which is incorporated herein by reference.

TECHNICAL FIELD

The present invention relates to a resin composition which comprises a polylactic acid resin and a polyacetal resin and has good moldability, workability, mechanical properties, heat resistance, transparency, etc.

BACKGROUND ART

As having a high melting point and moldable in melt, polylactic acid is expected to be a practicable good biodegradable polymer. However, since its crystallization rate is low, using polylactic acid for crystallized moldings is limited. For example, when injection-molded, polylactic acid requires a long molding cycle time or heat treatment after molding, and, in addition, its deformation in molding and heat treatment is great. These are serious problems in practical use of polylactic acid.

Polyacetal resin is good as its mechanical properties and moldability are well balanced, and it is widely used for injection moldings. However, since its crystallization rate is high, the resin could not be well formed into films and fibers and its use is also limited.

Mixing two or more different polymers is widely known for polymer blends or polymer alloys, and is widely utilized for overcoming the drawbacks of the individual polymers. However, when two polymers are mixed, they form separate phases in most cases, and therefore the properties of the polymer mixtures are not good.

Though rarely, on the other hand, two polymers may form a uniform amorphous phase. Those of the type are generally said miscible or compatible with each other, and their mixtures are expected to have good properties. However, there are only a few examples of such polymers.

Regarding polymer that is miscible with (mutually make miscible with) polylactic acid, there are known only a few examples such as polyethylene glycol (e.g., *Polymer* 37 (26), 5849-5857 (1996)) and polymethyl methacrylate (e.g., *Polymer* 39 (26), 6891-6897 (1998)). Regarding polymer that is miscible with polyacetal, there are known only a few examples such as polyvinylphenol (e.g., *Polymer* 33 (4), 760-766 (1992)).

JP-A 5-43772 discloses a resin composition prepared by adding an aliphatic polyester and a minute amount of formaldehyde to polyacetal for the purpose of making polyacetal biodegradable, concretely disclosing use of polylactic acid as one example of the aliphatic polyester, but does not disclose the miscibility of polylactic acid and polyacetal. The principal object of the invention described in the patent publication is especially to make polyacetal resin biodegradable in a composition that contains a relatively large quantity of polyacetal resin. Therefore, when it is going to obtain the composition that employ the characteristic of a polyacetal resin for ordinary use, its durability is not good and it is not practicable.

An object of the present invention is to provide a resin composition having good moldability, workability, mechanical properties, heat resistance and transparency.

DISCLOSURE OF THE INVENTION

We, the present inventors have found that polylactic acid resin and polyacetal resin are well miscible with each other and a resin composition prepared by mixing the two has good properties.

Specifically, the invention provides:

A resin composition which comprises from more than 60 parts by weight to 99 parts by weight of a polylactic acid resin and from 1 part by weight to less than 40 parts by weight of a polyacetal resin relative to 100 parts by weight of the total of the polylactic acid resin and the polyacetal resin;

A resin composition which comprises from 40 to 60 parts by weight of a polylactic acid resin and from 40 to 60 parts by weight of a polyacetal resin relative to 100 parts by weight of the total of the polylactic acid resin and the polyacetal resin and of which the formaldehyde content is smaller than 500 ppm relative to the polyacetal resin;

A resin composition which comprises from 1 part by weight to less than 40 parts by weight of a polylactic acid resin and more than 60 parts by weight to 99 parts by weight of a polyacetal resin relative to 100 parts by weight of the total of the polylactic acid resin and the polyacetal resin;

A resin composition comprising a polylactic acid resin, a polyacetal resin and a crystallization promoter;

A resin composition comprising a polylactic acid resin, a polyacetal resin and any other thermoplastic resin;

A resin composition comprising a polylactic acid, a polyacetal resin and a reinforcement;

A resin composition comprising a polylactic acid resin, a polyacetal resin, and at least one selected from a stabilizer and a mold release agent;

A resin composition comprising a polylactic acid resin, a polyacetal resin and a carboxyl group-reactive end-capping agent that are kneaded in melt;

And moldings, films and fibers of any of the above-mentioned resin compositions.

BRIEF DESCRIPTION OF THE DRAWINGS

FIG. 1 is a conceptual view showing a test piece set on a tool for measuring the cracking time in Example 12.

In the drawing, the reference numerals indicate the following.

1: Test Piece, 2: Tool.

BEST MODES OF CARRYING OUT THE INVENTION

The invention is described in detail hereinunder.

The polylactic acid resin for use in the invention is a polymer of which the essential constitutive component is L-lactic acid and/or D-lactic acid, but it may contain any other copolymerizing component than lactic acid. For the other monomer units, mentioned are glycol compounds such as ethylene glycol, propylene glycol, butanediol, heptanediol, hexanediol, octanediol, nonanediol, decanediol, 1,4-cyclohexanedimethanol, neopentyl glycol, glycerin, pentaerythritol, bisphenol A, polyethylene glycol, polypropylene glycol and polytetramethylene glycol; dicarboxylic acids such as oxalic acid, adipic acid, sebacic acid, azelaic acid, dodecadionic acid, malonic acid, glutaric acid, cyclohexanedicarboxylic acid, terephthalic acid, isophthalic acid, phthalic acid, naphthalenedicarboxylic acid, bis(p-carboxyphenyl)methane, anthracenedicarboxylic acid, 4,4'-diphenylether-dicarboxylic acid, 5-sodium sulfoisophthalic acid, 5-tetrabutylphosphonium isophthalic acid; hydroxycarboxylic acids such as glycolic acid, hydroxypropionic acid, hydroxybutyric acid, hydroxyvaleric acid, hydroxycaproic acid, hydroxybenzoic acid; and lactones such as caprolactone, valerolactone, propiolactone, undecalactone, 1,5-oxepan-2-one.

For obtaining a resin composition having especially good heat resistance and miscibility in the invention, it is desirable that the optical purity of the lactic acid component of the polylactic acid resin is as high as possible. Preferably, L-isomer lactic acid accounts for at least 80% or D-isomer lactic acid account for at least 80% of the overall lactic acid component of the polylactic acid resin; more preferably, L-isomer lactic acid accounts for at least 90% or D-isomer lactic acid account for at least 90% thereof; even more preferably, L-isomer lactic acid accounts for at least 95% or D-isomer lactic acid account for at least 80% thereof; still more preferably L-isomer lactic acid accounts for at least 98% or D-isomer lactic acid account for at least 98% thereof. The uppermost limit of the L-isomer or D-isomer lactic acid content is generally at most 100%.

In case where a polylactic acid resin that contains both a poly-L-lactic acid resin consisting essentially of L-lactic acid units and a poly-D-lactic acid resin consisting essentially of D-lactic acid units is used, it gives a composition having especially excellent heat resistance and moldability. The optical purity of the poly-L-lactic acid resin consisting essentially of L-lactic acid units, as well as that of the poly-D-lactic acid resin consisting essentially of D-lactic acid units preferably falls within the above-mentioned range.

For producing the polylactic acid resin, employable is any known polymerization method. For example, the resin may be produced through direct polycondensation of lactic acid or through ring opening polymerization of lactide.

The molecular weight and the molecular weight distribution of the polylactic acid resin are not specifically defined so far as the resin enables substantial molding. In general, the weight-average molecular weight of the resin is at least 10,000, but preferably at least 40,000, more preferably at least 80,000. The weight-average molecular weight as referred to herein means a molecular weight of polymer measured through gel permeation chromatography in terms of a standard of polymethyl methacrylate (PMMA).

The melting point of the polylactic acid resin is not also specifically defined, but is preferably not lower than 120° C., more preferably not lower than 150° C.

The polyacetal resin for use in the invention is a polymer having oxymethylene units as the essential repetitive units.

It may be any of a polyacetal homopolymer to be obtained through polymerization of an essential starting material of formaldehyde or trioxane, or a polyacetal copolymer consisting essentially of oxymethylene units and containing at most 15% by weight of oxyalkylene units with from 2 to 8 neighboring carbon atoms in the backbone chain, or a copolymer containing any other constitutive units such as a block copolymer, a terpolymer or a crosslinked polymer. One or more of these may be used herein.

Above all, a polyacetal copolymer is preferred. More preferred is a polyacetal copolymer that contains at most 2% by weight of oxyalkylene units with 2 neighboring carbon atoms in the backbone chain, or a polyacetal copolymer that contains at most 5% by weight of oxyalkylene units with 4 neighboring carbon atoms in the backbone chain; and even more preferred are a polyacetal copolymer that contains from 0.2 to 1.4% by weight of oxyalkylene units with 2 neighboring carbon atoms in the backbone chain, or a polyacetal copolymer that contains from 0.5 to 3% by weight of oxyalkylene units with 4 neighboring carbon atoms in the main chain.

Not specifically defined, the polyacetal resin for use in the invention may be produced in any known method. One typical example of producing a polyacetal homopolymer comprises polymerizing a high-purity formaldehyde in an organic solvent that contains a basic polymerization catalyst such as an organic amine, an organic or inorganic tin compound or a metal hydroxide, then taking out the resulting polymer through filtration, and acetylating the polymer terminals under heat in acetic anhydride in the presence of sodium acetate.

One typical example of producing a polyacetal copolymer comprises introducing a high-purity trioxane and a copolymerizing component such as ethylene oxide or 1,3-dioxolane into an organic solvent such as cyclohexane, then subjecting them into cationic polymerization in the presence of a Lewis acid catalyst such as boron trifluoride-diethyl ether complex, and thereafter inactivating the catalyst and stabilizing the terminal group of the resulting copolymer; or introducing trioxane, the copolymerizing component and the catalyst in a self-cleaning stirrer with no solvent therein, subjecting them into bulk polymerization, and thereafter decomposing and removing the unstable terminals.

The polymer viscosity is not specifically defined so far as the polymer is usable as a molding material. Preferably, however, the melt flow rate (MFR) of the polymer is measurable according to ASTM D1238, and MFR of the polymer thus measured preferably falls between 1.0 and 50 g/10 min, more preferably between 1.5 and 35 g/10 min.

Preferably, the polyacetal resin for use in the invention contains at least one of 2,2'-methylenebis(4-methyl-6-t-butylphenol), calcium ricinoleate, cyanoguanidine, hexamethylene bis(3,5-t-butyl-4-hydroxyhydrocinnamate), melamine-formaldehyde resin, nylon 6/66, nylon 66/610/6, nylon 612/6, tetrakis[methylene(3,5-di-t-butyl-4-hydroxyhydrocinnamate)]methane, 1,6-hexanediol bis[3-(3,5-di-t-butyl-4-hydroxyphenyl)propionate], and triethylene glycol [3-(3,5-di-t-butyl-5-methyl-4-hydroxyphenyl)propionate].

In the resin composition of the invention, the polylactic acid resin and the polyacetal resin are miscible with each other, therefore having peculiar characteristics not seen in ordinary immiscible compositions, as so mentioned hereinunder. Accordingly, the composition has excellent moldability, workability, mechanical properties, heat resistance, transparency, etc. Depending on the blend ratio of the polylactic acid and the polyacetal resin therein, the properties of the resin composition specifically vary. Concretely, a resin composition that comprises from more than 60 parts by weight to 99 parts by weight of a polylactic acid resin and from 1 part by weight to less than 40 parts by weight of a polyacetal resin relative to 100 parts by weight of the total of the polylactic acid resin and the polyacetal resin; especially a resin composition that comprises from 65 parts by weight to 99 parts by weight of a polylactic acid resin and from 1 part by weight to 35 parts by weight of a polyacetal resin is useful for improving the properties of polylactic acid resin, and the composition of the type of the invention is especially effective for improving the moldability and the heat resistance of the resin. Having the properties characteristic of polylactic acid, the resin composition of the type may be biodegradable.

A resin composition that comprises from 40 to 60 parts by weight of a polylactic acid resin and from 40 to 60 parts by weight of a polyacetal resin relative to 100 parts by weight of the total of the polylactic acid resin and the polyacetal resin is good as the properties of the polylactic acid resin and the polyacetal resin therein are well balanced.

A resin composition that comprises from 1 part by weight to less than 40 parts by weight of a polylactic acid resin and more than 60 parts by weight to 99 parts by weight of a polyacetal resin relative to 100 parts by weight of the total of the polylactic acid resin and the polyacetal resin may improve the properties of the polyacetal resin and is especially effective for improving the workability and the mechanical properties of the resin.

In case where polyacetal resin is used, especially when the amount thereof is at least 40 parts by weight, it is desirable that formaldehyde which may have some significant influence on the properties of the composition itself, for example, promoting the decomposition of polyacetal to detract from the durability of the composition, is not added to the composition. Even though formaldehyde in polyacetal resin itself is taken into consideration, it is desirable that the formaldehyde content of the resin composition is at most smaller than 500 ppm relative to the polyacetal resin, more preferably smaller than 250 ppm, even more preferably smaller than 100 ppm. To attain the formaldehyde content as above, the polyacetal resin to be used shall be stabilized in a method of acetylating the polymer terminals after polymerization to give the polyacetal homopolymer or in a method of decomposing and removing the unstable terminals after the polymerization to give the polyacetal copolymer, as so mentioned hereinabove. The formaldehyde content of the resin composition may be determined by grinding the resin composition, stirring the resulting powder in water at 50° C. for 6 hours to extract formaldehyde, and measuring its amount according to an acetylacetone method.

Alternatively, it may also be determined according to an MBTH (3-methyl-2-benzothiazolinonehydrazone) method.

The resin composition of the invention is characterized in that the polylactic acid resin and the polyacetal resin therein are miscible with each other. The "miscibility" as referred to herein is for describing a polymer mixture that forms a uniform phase in an amorphous phase on a molecular level. In case where one or both components of a composition form both a crystalline phase and an amorphous phase, the miscibility of the composition means that the amorphous phase forms a molecular level mixture.

The miscibility of a composition may be judged in some methods.

The most popular method for judging the miscibility of a composition is based on the glass transition temperature of the composition. The glass transition temperature of a miscible composition differs from that of the individual components, and in many cases, a miscible composition has a single glass transition temperature. For the composition of a polylactic acid resin and a polyacetal resin, the method is employable. The glass transition temperature of the resin composition of the invention is lower than that of the polylactic acid resin alone. For measuring the glass transition temperature, employable is any of a method of measuring it with a differential scanning calorimeter (DSC), or a method of measuring it in a dynamic viscoelastometry test.

However, since polyacetal resin is highly crystalline, a composition that contains a large amount of polyacetal resin is problematic in that its glass transition temperature may be unclear. In this case, the crystallization temperature of polyacetal resin may be a criterion for the miscibility of the composition. In case where polyacetal resin has formed a miscible composition along with a resin of which the crystallization rate is lower than that of the polyacetal resin itself, the crystallization rate of the polyacetal resin in the resulting composition lowers than that of the polyacetal resin alone. The crystallization rate depression may be confirmed in the crystallization temperature profile in cooling in DSC.

For example, *Polymer* 38 (25), 6135-6143 (1997) reports that a blend of poly(3-hydroxybutyrate), a type of aliphatic polyester, and polymethylene oxide (polyacetal) is immiscible. It shows that, in this case, the crystallization temperature of polyacetal in the composition measured with DSC in cooling does not almost differ from the crystallization temperature of polyacetalalone. On the other hand, Polymer 33 (4), 760-766 (1992) reports that polyacetal and polyvinylphenol are miscible with each other. It shows that, in this case, the crystallization temperature of polyacetal in the composition in cooling is lower than the crystallization temperature of polyacetal alone.

In the invention, the crystallization temperature of the polyacetal resin in the resin composition in cooling is lower than the crystallization temperature of the polyacetal resin alone. The preferred crystallization temperature depression varies, depending on the composition. The crystallization temperature depression becomes larger when the optical purity of the polylactic acid resin in the composition is higher.

In case where the resin composition comprises from more than 60 parts by weight to 99 parts by weight of a polylactic acid resin and from 1 part by weight to less than 40 parts by weight of a polyacetal resin relative to 100 parts by weight of the total of the polylactic acid resin and the polyacetal resin, it is desirable that the crystallization temperature depression is at least 5° C. measured through DSC at a cooling rate of 20° C./min, more preferably at least 7° C. When the resin composition comprises from 40 to 60 parts by weight of a polylactic acid resin and from 40 to 60 parts by weight of a polyacetal resin relative to 100 parts by weight of the total of the polylactic acid resin and the polyacetal resin, it is desirable that the crystallization temperature depression is at least 2° C., more preferably at least 4° C. When the resin composition comprises from 1 part by weight to less than 40 parts by weight of a polylactic acid resin and from more than 60 parts by weight to 99 parts by weight of a polyacetal resin relative to 100 parts by weight of the total of the polylactic acid resin and the polyacetal resin, it is desirable that the crystallization temperature depression is at least 0.2° C., more preferably at least 0.5° C.

Films formed of a miscible composition are optically transparent, but those formed of an immiscible composition are generally opaque. This method may also be employed for an index of miscibility. However, when the two components are both crystalline resins, as in the composition of polylactic acid resin and polyacetal resin, the films may be opaque owing to the crystallization of any one of them. Therefore, all opaque films do not always indicate that the compositions are immiscible. In the invention, however, when the polylactic acid content of the resin composition is relatively large, the optical transparency of the films of the composition will be effective for judging the miscibility of the composition.

For example, in a region of the resin composition of the invention where the polylactic acid content is large, especially where it is more than 60 parts by weight, substantially transparent films having a thickness of 100 μm, through which the opposite scene can be clearly seen, can be formed of the resin composition by rapidly cooling it from its molten condition to 0° C., and in addition, films having a thickness of 100 μm, and having a light transmittance of from 95% to 100% and a haze of from 0% to 10% can also be formed of it. Even in a region of the resin composition where the polylactic acid content is small, concretely where it is at most 60 parts by weight, films having a thickness of 100 μm, and having a light transmittance of from 90% to 100% and a haze of from 0% to 50% can also be formed of the composition. If the resin composition having such a low polylactic acid content is rapidly cooled to a further lower temperature, substantially transparent films may also be formed of it.

The substantially transparent films thus obtained are characterized in that they are stiff and are well post-workable for stretching, since the miscible polymer amount therein is large. The same shall apply also to fibers and other moldings.

In the invention, it is desirable that the composition contains a crystallization promoter. The resin composition that comprises a polylactic acid resin, a polyacetal resin and a crystallization promoter has good moldability to give moldings of good heat resistance. In particular, the polylactic acid resin in the composition well crystallizes even in ordinary injection-molding, and the composition gives moldings of good heat resistance. When a plasticizer is used for the crystallization promoter, its bleeding out is often problematic. In the invention, however, the resin composition and its moldings have good bleed-out resistance.

The crystallization promoter for use in the invention may be selected from various types of compounds. For it, preferred are a nucleating agent that promotes the formation of polymer crystal nuclei, and a plasticizer that acts to soften polymer for promoting the polymer crystal growth.

Preferably, the amount of the crystallization promoter to be in the invention is from 0.01 parts by weight to 30 parts by weight, more preferably from 0.05 parts by weight to 20 parts by weight relative to 100 parts by weight of the total of the polylactic acid resin and the polyacetal resin in the composition.

The nucleating agent to be used for the crystallization promoter in the invention is not specifically defined, and any ordinary polymer nucleating agent may be used for it. For example, any of inorganic nucleating agents and organic nucleating agents are usable herein. Specific examples of inorganic nucleating agents are talc, kaolinite, montmorillonite, synthetic mica, clay, zeolite, silica, graphite, carbon black, zinc oxide, magnesium oxide, titanium oxide, calcium sulfide, boron nitride, calcium carbonate, barium sulfate, aluminium oxide, neodymium oxide, and metal salts of phenyl phosphonate, etc. Preferably, these inorganic nucleating agents are modified with organic matter for improving their dispersibility in the composition.

Specific examples of organic nucleating agents are metal salts of organic carboxylic acids such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminium dibenzoate, potassium dibenzoate, lithium dibenzoate, sodium β-naphthalate, sodium cyclohexanecarboxylate; salts of organic sulfonic acids such as sodium p-toluenesulfonate, sodium sulfoisophthalate; carbonamides such as stearamide, ethylenebislauramide, palmitamide, hydroxystearamide, erucamide, trimesic tris(t-butylamide); polymers such as low-density polyethylene, high-density polyethylene, polypropylene, polyisopropylene, polybutene, poly-4-methylpentene, poly-3-methylbutene-1, polyvinylcycloalkane, polyvinyltrialkylsilane, high-melting-point polylactic acid; sodium salts or potassium salts of carboxyl group—having polymers (ionomers) such as sodium salt of ethylene-acrylic acid or methacrylic acid copolymer, sodium salt of styrene-maleic anhydride copolymer; benzylidene sorbitol and its derivatives; metal salts of phosphorus compounds such as sodium-2,2'-methylenebis(4,6-di-t-butylphenyl) phosphate; and 2,2-methylbis(4,6-di-t-butylphenyl)sodium, etc.

Of the above-mentioned examples, at least one selected from talc and metal salts of organic carboxylic acids is preferred for the nucleating agent for use in the invention. One or more such nucleating agents may be used in the invention either singly or as combined.

The amount of the nucleating agent to be in the resin composition is preferably from 0.01 to 30 parts by weight, more preferably from 0.05 to 10 parts by weight, even more preferably from 0.1 to 5 parts by weight relative to 100 parts by weight of the polylactic acid resin and the polyacetal resin therein.

Any well known plasticizer may be used in the invention. For example, herein usable are polyester-type plasticizers, glycerin-type plasticizers, polycarboxylate-type plasticizers, phosphate-type plasticizers, polyalkylene glycol-type plasticizers and epoxy-type plasticizers.

Specific examples of polyester-type plasticizers are polyesters that comprises an acid component such as adipic acid, sebacic acid, terephthalic acid, isophthalic acid, naphthalenedicarboxylic acid, diphenyldicarboxylic acid, and a diol component such as propylene glycol, 1,3-butanediol, 1,4-butanediol, 1,6-hexanediol, ethylene glycol, diethylene glycol; and polyesters of hydroxycarboxylic acids such as polycaprolactone. These polyesters may be terminated with a monofunctional carboxylic acid or a monofunctional alcohol, or may be terminated with an epoxy compound, etc.

Specific examples of glycerin-type plasticizers are glycerin monoacetomonolaurate, glycerin diacetomonolaurate, glycerin monoacetomonostearate, glycerin diacetomonolaurate, glycerin monoacetomonomontanate, etc.

Specific examples of polycarboxylic acid-type plasticizers are phthalates such as dimethyl phthalate, diethyl phthalate, dibutyl phthalate, dioctyl phthalate, diheptyl phthalate, dibenzyl phthalate, butylbenzyl phthalate; trimellitates such as tributyl trimellitate, trioctyl trimellitate, trihexyl trimellitate; adipates such as diisodecyl adipate, n-octyl-n-decyl adipate; citrates such as triethyl acetylcitrate, tributyl acetylcitrate; azelates such as di-2-ethylhexyl azelate; sebacates such as dibutyl sebacate, di-2-ethylhexyl sebacate, etc.

Specific examples of phosphate-type plasticizers are tributyl phosphate, tri-2-ethylhexyl phosphate, trioctyl phosphate, triphenyl phosphate, diphenyl-2-ethylhexyl phosphate, tricresyl phosphate, etc.

Specific examples of polyalkylene glycol-type plasticizers are polyalkylene glycols such as, polyethylene glycol, polypropylene glycol, poly(ethylene oxide/propylene oxide) block and/or random copolymers, polytetramethylene glycol, bisphenol-ethylene oxide addition polymers, bisphenol-propylene oxide addition polymers, bisphenol-tetrahydrofuran addition polymers, etc. and their terminal-blocked compounds such as epoxy-modified compounds, ester-modified compounds and ether-modified compounds.

Epoxy-type plasticizers are generally epoxytriglycerides of alkyl epoxystearates with soybean oil. In addition to these, also usable herein are other ordinary epoxy resins mainly comprising bisphenol A and epichlorohydrin.

Specific examples of other plasticizers usable herein are benzoates with aliphatic polyols such as neopentylglycol dibenzoate, diethylene glycol dibenzoate, triethylene glycol di-2-ethylbutyrate; fatty acid amides such as stearamide; aliphatic carboxylates such as butyl oleate; esters of hydroxyacids such as methyl acetylricinoleate, butyl acetylricinoleate; pentaerythritol, various sorbitols, polyacrylates, silicone oil, paraffins, etc.

Of the above-mentioned examples, at least one selected from the polyester-type plasticizers and the polyalkylene glycol-type plasticizers is preferred for use in the invention. One or more such plasticizers may be used in the invention either singly or as combined.

The amount of the plasticizer in the resin composition is preferably from 0.01 to 30 parts by weight, more preferably from 0.1 to 20 parts by weight, even more preferably from 0.5 to 10 parts by weight relative to 100 parts by weight of the total of the polylactic acid resin and the polyacetal resin in the composition.

In the invention, the nucleating agent and the plasticizer may be used separately, but are preferably used together.

Preferably, the resin composition of the invention further contains an impact modifier. The resin composition that comprises a polylactic acid resin, a polyacetal resin and an impact modifier gives moldings of good impact strength, moldability, mechanical properties and heat resistance.

The impact modifier for use in the invention is not specifically defined and may be any and every one generally used for improving the impact resistance of ordinary thermoplastic resins. For example, at least one selected from various impact modifiers mentioned below may be used herein.

Specific examples of impact modifiers are polyethylene, polypropylene, ethylene-propylene copolymers, ethylene-propylene-non-conjugated diene copolymers, ethylene-butene-1 copolymers, various acrylic rubbers, ethylene-acrylic acid copolymers and their alkali metal salts (ionomers), ethylene-glycidyl (meth)acrylate copolymers, ethylene-alkyl acrylate copolymers (e.g., ethylene-ethyl acrylate copolymers, ethylene-butyl acrylate copolymers), acid-modified ethylene-propylene copolymers, diene rubbers (e.g., polybutadiene, polyisoprene, polychloroprene), copolymers of dienes and vinyl monomers (e.g., styrene-butadiene random copolymers, styrene-butadiene block copolymers, styrene-butadiene-styrene block copolymers, styrene-isoprene random copolymers, styrene-isoprene block copolymers, styrene-isoprene-styrene block copolymers, styrene-grafted polybutadiene copolymers, butadiene-acrylonitrile copolymers), polyisobutylene, copolymers of isobutylene and butadiene or isoprene, natural rubbers, Thiokol rubbers, polysulfide rubbers, polyurethane rubbers, polyether rubbers, epichlorohydrin rubbers, etc.

In addition, other polymers having a different degree of polymerization, polymers having various microstructures such as those having a cis-structure or a trans-structure, polymers having a vinyl group or the like, and core/shell-type multi-layered polymers which are composed of one core layer and one or more shell layers that cover it and in which the neighboring layers are formed of different types of polymers are also usable herein.

Various examples of the (co)polymers mentioned above may be any of random copolymers, block copolymers and graft copolymers. Any of these are usable for the impact modifier in the invention.

Further, in preparing the (co)polymers, they may be copolymerized with any other monomers of, for example, various olefins, dienes, aromatic vinyl compounds, acrylic acid, acrylates and methacrylates.

Of those impact modifiers, preferred are polymers with acrylic units, and polymers with acid anhydride group and/or glycidyl group-having units. Preferred examples of acrylic units referred to herein are methyl methacrylate units, methyl acrylate units, ethyl acylate units and butyl acrylate units; and preferred examples of acid anhydride group-having units and glycidyl group-having units are maleic anhydride units and glycidyl methacrylate units.

Also preferably, the impact modifier is a core/shell-type multi-layered polymer which is composed of a core layer and one or more shell layers that cover it and in which the neighboring layers are formed of different types of polymers, more preferably, such a multi-layered polymer in which the shell layer contains methyl methacrylate units or methyl acrylate units. The multi-layered polymer of the type preferably contains acrylic units or contains acid anhydride group and/or glycidyl group-having units. Preferred examples of acrylic units are methyl methacrylate units, methyl acrylate units, ethyl acylate units and butyl acrylate units; and preferred examples of acid anhydride group-having units and glycidyl group-having units are maleic anhydride units and glycidyl methacrylate units. In particular, a multi-layered polymer that contains at least one selected from methyl methacrylate units, methyl acrylate units, maleic anhydride units and glycidyl methacrylate units in its shell layer and contains at least one selected from butyl acrylate units, ethyl acrylate units, styrene units and butadiene units in its core layer is preferred for use herein.

In view of the stability of polyacetal resin in the resin composition, it is desirable that substantially no anion is detected in the impact modifier to be in the composition.

Also preferably, the glass transition temperature of the impact modifier is not higher than $-20°$ C., more preferably not higher than $-30°$ C.

It is desirable that the amount of the impact modifier to be in the resin composition is from 0.5 parts by weight to 120 parts by weight, more preferably from 1 part by weight to 60 parts by weight relative to 100 parts by weight of the total of the polylactic acid resin and the polyacetal resin in the composition.

Also preferably, the resin composition further contains at least one selected from acrylic resins, polyester resins except polylactic acid, and polyamide resins in the invention. Additionally containing the resin, the resin composition gives moldings of better properties.

For the acrylic resins for use in the invention, preferred are those mainly comprising alkyl (meth)acrylate units in which the alkyl group has from 1 to 4 carbon atoms. The alkyl (meth)acrylate in which the alkyl group has from 1 to 4 carbon atoms may be copolymerized with any other alkyl acrylate in which the alkyl group has from 1 to 4 carbon atoms or with an aromatic vinyl compound such as styrene. In the acrylic resin, the essential component shall account for more than 50 mol % of all the units constituting the resin.

Examples of the alkyl (meth)acrylate in which the alkyl group is defined as above are methyl acrylate, methyl methacrylate, ethyl acrylate, ethyl methacrylate, butyl acrylate, butyl methacrylate, cyclohexyl acrylate and cyclohexyl methacrylate.

Preferably, the acrylic resin for use in the invention has a glass transition temperature of not lower than $0°$ C., more preferably not lower than $20°$ C.

For the acrylic resin for use in the invention, especially preferred is polymethyl methacrylate which is formed of methyl methacrylate.

The amount of the acrylic resin to be in the resin composition of the invention is not specifically defined. For further improving the miscibility and the properties of the resin composition, however, the amount of the acrylic resin in the composition is preferably from 0.5 parts by weight to 49 parts by weight, more preferably from 0.5 parts by weight to 40 parts by weight relative to 100 parts by weight of the total of the polylactic acid resin, polyacetal resin and the acrylic resin therein.

Additionally containing such an acrylic resin, the resin composition of the invention has better moldability and gives moldings of better workability, mechanical properties and heat resistance.

The polyester resin for use in the invention is a polymer or copolymer obtained through polycondensation of at least one selected from (a) a dicarboxylic acid or its ester-forming derivative, and a diol or its ester-forming derivative, (b) a hydroxycarboxylic acid or its ester-forming derivative, and (c) a lactone, and is a thermoplastic polyester resin except polylactic acid resin.

The dicarboxylic acid or its ester-forming derivative includes aromatic dicarboxylic acids such as terephthalic acid, isophthalic acid, phthalic acid, 2,6-naphthalenedicarboxylic acid, 1,5-naphthalenedicarboxylic acid, bis (p-carboxyphenyl)methane, anthracenedicarboxylic acid, 4,4'-diphenylether-dicarboxylic acid, 5-tetrabutylphosphonium-isophthalic acid, 5-sodium-sulfoisophthalic acid; aliphatic dicarboxylic acids such as oxalic acid, succinic acid, adipic acid, sebacic acid, azelaic acid, dodecadionic acid, malonic acid, glutaric acid, dimer acids; alicyclic dicarboxylic acid units such as 1,3-cyclohexanedicarboxylic acid, 1,4-cyclohexanedicarboxylic acid; and their ester-forming derivatives.

The diol or its ester-forming derivative includes aliphatic glycols having from 2 to 20 carbon atoms, such as ethylene glycol, propylene glycol, 1,4-butanediol, neopentylglycol, 1,5-pentanediol, 1,6-hexanediol, decamethylene glycol, cyclohexanedimethanol, cyclohexanediol, dimer diols; long-chain glycols having a molecular weight of from 200 to 100000, such as polyethylene glycol, poly-1,3-propylene glycol, polytetramethylene glycol; aromatic dioxy compounds such as 4,4'-dihydroxybiphenyl, hydroquinone, t-butylhydroquinone, bisphenol A, bisphenol S, bisphenol F; and their ester-forming derivatives.

The hydroxycarboxylic acid includes glycolic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, and their ester-forming derivatives, etc. The lactone includes caprolactone, valerolactone, propiolactone, undecalactone, 1,5-oxepan-2-one, etc.

Specific examples of these polymers and copolymers are aromatic polyesters such as polybutylene terephthalate, polybutylene (terephthalate/isophthalate), polypropylene terephthalate, polypropylene (terephthalate/isophthalate), polyethylene terephthalate, polyethylene (terephthalate/isophthalate), bisphenol A (terephthalate/isophthalate), polybutylene naphthalate, polybutylene (terephthalate/naphthalate), polypropylene naphthalate, polyethylene naphthalate, polycyclohexanedimethylene terephthalate, polycyclohexanedimethylene (terephthalate/isophthalate), poly (cyclohexanedimethylene/ethylene) terephthalate, poly (cyclohexanedimethylene/ethylene) (terephthalate/isophthalate), polybutylene (terephthalate/isophthalate)/ bisphenol A, polyethylene (terephthalate/isophthalate)/ bisphenol A; copolymers prepared through copolymerization of polyethers or aliphatic polyesters with aromatic polyesters, such as polybutylene (terephthalate/succinate), polyethylene (terephthalate/succinate), polybutylene (terephthalate/adipate), polyethylene (terephthalate/adipate), polyethylene (terephthalate/sulfoisophthalate/adipate), polybutylene (terephthalate/sebacate), polyethylene (terephthalate/sebacate), polyether-ester copolymer of polybutylene terephthalate:polyethylene glycol, polyether-ester copolymer of polyethylene terephthalate:polyethylene glycol, polybutylene terephthalate:poly(tetramethylene oxide)glycol block copolymer, polybutylene terephthalate/isophthalate: poly (tetramethylene oxide) glycol block copolymer, polybutylene terephthalate:poly(propylene oxide/ethylene oxide)glycol block copolymer, polybutylene (terephthalate/isophthalate) poly(propylene oxide/ethylene oxide)glycol block copolymer, polybutylene terephthalate:polybutylene adipate block copolymer, polybutylene terephthalate:poly-ϵ-caprolactone copolymer; polyhydroxyalkanoates such as polyethylene oxalate, polybutylene oxalate, polyneopentylglycol oxalate, polyethylene succinate, polybutylene succinate, polybutylene adipate, polyethylene adipate, polybutylene (succinate/ adipate), polyethylene (succinate/adipate), polyhydroxybutyric acid, copolymer of β-hydroxybutyric acid and β-hydroxyvaleric acid; aliphatic polyesters such as polycaprolactone; aliphatic polyester carbonates such as polybutylene succinate:carbonate; liquid-crystalline polyesters, for example, copolyesters such as p-oxybenzoic acid/polyethylene terephthalate, p-oxybenzoic acid/6-oxy-2-naphthoic acid, etc.

Of those, preferred are polymers prepared through polycondensation essentially of an aromatic dicarboxylic acid or its ester-forming derivative and an aliphatic diol or its ester-forming derivative. Concretely, preferred examples of such polymers are polybutylene terephthalate, polypropylene terephthalate, polyethylene terephthalate, poly(cyclohexanedimethylene/ethylene) terephthalate, polybutylene naphthalate, polybutylene (terephthalate/isophthalate), (polyethylene terephthalate/isophthalate), polyether-ester copolymer of polybutylene terephthalate-polyethylene glycol, polyether-ester copolymer of polyethylene terephthalate:polyethylene glycol, polyether-ester copolymer of polybutylene terephthalate-poly(tetramethylene oxide)glycol, polyether-ester copolymer of polyethylene terephthalate-poly(tetramethylene oxide)glycol, polyether-ester copolymer of polybutylene (terephthalate/isophthalate):poly(tetramethylene oxide)glycol, polybutylene (terephthalate/adipate), and polyethylene (terephthalate/adipate). Preferably, the ratio of the aromatic dicarboxylic acid or its ester-forming derivative to the total dicarboxylic acid in the polymer, which is prepared through polycondensation of mainly the aromatic dicarboxylic acid or its ester-forming derivative and the aliphatic diol or its ester-forming derivative, is at least 50 mol %, more preferably at least 60 mol %.

Of the polymers, especially preferred are those that are prepared through polycondensation of mainly terephthalic acid or its ester-forming derivative and butanediol or its ester-forming derivative. Concretely, the preferred polymers are polybutylene terephthalate, polybutylene (terephthalate/ isophthalate), polyether-ester copolymer of polybutylene terephthalate:polyethylene glycol, polyether-ester copolymer of polybutylene terephthalate:poly(tetramethylene oxide) glycol, polyether-ester copolymer of polybutylene (terephthalate/isophthalate):poly(tetramethylene oxide)glycol, and polybutylene (terephthalate/adipate). More preferably, the ratio of terephthalic acid or its ester-forming derivative to the total dicarboxylic acid in the polymer, which is prepared through polycondensation of mainly terephthalic acid or its ester-forming derivative and butanediol or its ester-forming derivative, is at least 50 mol %, more preferably at least 60 mol %.

Preferred examples of the thermoplastic polyester resin for use in the invention are polyester carbonates and polyhydroxyalkanoates. Concretely, they are polybutylene succinate carbonate, polyhydroxybutyric acid, and copolymer of β-hydroxybutyric acid and β-hydroxyvaleric acid. One or more of these may be used herein either singly or as combined.

The amount of the thermoplastic polyester resin to be in the resin composition is preferably from 1 part by weight to 100 parts by weight, more preferably from 3 parts by weight to 70 parts by weight, even more preferably from 5 parts by weight to 50 parts by weight relative to 100 parts by weight of the total of the polylactic acid resin and the polyacetal resin in the composition.

Additionally containing such a thermoplastic polyester, the resin composition of the invention has better moldability and gives moldings of better mechanical properties, heat resistance and chemical resistance.

The polyamide resin for use in the invention is a thermoplastic polymer having an amido bond and obtained from an amino acid, a lactam or a diamine and a dicarboxylic acid.

The amino acid includes 6-aminocaproic acid, 11-aminoundecanoic acid, 12-aminododecanoic acid, paraminomethylbenzoic acid, etc.; the lactam includes ε-caprolactam, ω-laurolactam, etc.

The diamine includes tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, 2,4-dimethyloctamethylenediamine, metaxylylenediamine, paraxylylenediamine, 1,3-bis(aminomethyl)cyclohexane, 1-amino-3-aminomethyl-3,5,5-trimethylcyclohexane, 3,8-bis(aminomethyl)tricyclodecane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, etc.

The dicarboxylic acid includes adipic acid, suberic acid, azelaic acid, sebacic acid, dodecane-diacid, terephthalic acid, isophthalic acid, naphthalenedicarboxylic acid, 2-chloroterephthalic acid, 2-methylterephthalic acid, 5-methylisophthalic acid, 5-sodium-sulfoisophthalic acid, hexahydroterephthalic acid, hexahydroisophthalic acid, diglycolic acid, etc.

Preferred examples of the polyamide for use in the invention are polycaproamide (nylon 6), polytetramethylene-adipamide (nylon 46), polyhexamethylene-adipamide (nylon 66), polyhexamethylene-sebacamide (nylon 610), polyhexamethylene-dodecamide (nylon 612), polyundecamethylene-adipamide (nylon 116), polyundecanamide (nylon 11), poly-undecanamide (nylon 12), polytrimethylhexamethylene-terephthalamide, polyhexamethylene-isophthalamide (nylon 6I), polyhexamethylene-terephthal/isophthalamide (nylon 6T/6I), polybis(4-aminocyclohexyl)methane-dodecamide (nylon PACM12), polybis(3-methyl-4-aminocyclohexyl)methane-dodecamide (nylondimethyl PACM12), polymetaxylylene-adipamide (nylon MXD6), polyundecamethylene-terephthalamide (nylon 11T), polyundecamethylene-hexahydroterephthalamide (nylon 11T(H)), and their copolyamides and mixed polyamides. Of those, preferred are nylon 6, nylon 66, nylon 11, nylon 12, nylon 610, nylon 612, nylon 116, and their copolyamides and mixed polyamides; and more preferred are nylon 6, nylon 11 and nylon 12.

In view of the thermal stability of the polylactic acid resin and the polyacetal resin for use herein, it is desirable that the polyamide resin to be used along with them has a melting point of from 90° C. to 240° C., more preferably from 100° C. to 230° C.

The amount of the polyamide resin to be in the resin composition is preferably from 1 part by weight to 100 parts by weight, more preferably from 3 parts by weight to 70 parts by weight, even more preferably from 5 parts by weight to 50 parts by weight relative to 100 parts by weight of the total of the polylactic acid resin and the polyacetal resin in the composition.

Additionally containing such a polyamide resin, the resin composition of the invention has better moldability and gives moldings of better mechanical properties, heat resistance, stiffness and abrasion resistance.

Preferably, the resin composition of the invention further contains a reinforcement. Additionally containing a reinforcement, the composition gives moldings of much better mechanical properties and heat resistance.

Any and every type of reinforcement generally used for reinforcing ordinary thermoplastic resin may be used in the invention, including fibrous, tabular, granular and powdery materials. Concretely, herein usable are inorganic fibrous reinforcements such as glass fibers, asbestos fibers, carbon fibers, graphite fibers, metallic fibers, potassium titanate whiskers, aluminium borate whiskers, magnesium-based whiskers, silicon-based whiskers, wollastonite, sepiolite, asbestos, slug fibers, xonotlite, ellestadite, gypsum fibers, silica fibers, silica-alumina fibers, zirconia fibers, boron nitride fibers, silicon nitride fibers and boron fibers; organic fibrous reinforcements such as polyester fibers, nylon fibers, acrylic fibers, regenerated cellulose fibers, acetate fibers, kenaf, ramie, cotton, jute, hemp, sisal, flax, linen, silk, Manila hemp, sugar cane, wood pulp, paper waste, wool; tabular or granular reinforcements such as glass flakes, non-swelling mica, graphite, metal foil, ceramic beads, talc, clay, mica, sericite, zeolite, bentonite, dolomite, kaolin, silicic acid powder, feldspar powder, potassium titanate, shirasu balloons, calcium carbonate, magnesium carbonate, barium sulfate, calcium oxide, aluminium oxide, titanium oxide, aluminium silicate, silicon oxide, gypsum, novaculite, dawsonite, white clay, etc. Of those, preferred are inorganic fibrous reinforcements, and more preferred are glass fibers, wollastonite, aluminium borate whiskers and potassium titanate whiskers. Also preferred is using organic fibrous reinforcements. For taking advantage of the biodegradability of polylactic acid resin, more preferred are natural fibers and regenerated fibers. Also preferably, the fibrous reinforcements have an aspect ratio of at least 5, more preferably at least 10, even more preferably at least 20.

The reinforcement may be coated or bound with a thermoplastic resin such as an ethylene/vinyl acetate copolymer or with a thermosetting resin such as an epoxy resin, or may be processed with a coupling agent such as an aminosilane or an epoxysilane.

The amount of the reinforcement to be in the resin composition is preferably from 0.1 parts by weight to 200 parts by weight, more preferably from 0.5 parts by weight to 100 parts by weight relative to 100 parts by weight of the total of the polylactic acid resin and the polyacetal resin in the composition.

Also preferably, the resin composition of the invention further contains a phyllosilicate in which the exchangeable cations existing in the interlayers have been exchanged with organic onium ions. In the invention, the phyllosilicate in which the exchangeable cations existing in the interlayers have been exchanged with organic onium ions, as referred to herein, is a clathrate compound that is prepared by exchanging the exchangeable cations in the interlayers of a phyllosilicate that has such exchangeable cations in its interlayers, with organic onium ions.

The phyllosilicate having exchangeable cations in its interlayers has a laminate structure of tabular parts each having a width of from 0.05 to 0.5 μm and a thickness of from 6 to 15 angstroms, and has exchangeable cations in the interlayers of the tabular parts therein. Its cation-exchangeable capacity may be from 0.2 to 3 meq/g, but preferably from 0.8 t 1.5 meq/g.

Specific examples of the phyllosilicate are smectite clay minerals such as montmorillonite, beidellite, nontronite, saponite, hectorite, sauconite; other various clay minerals such as vermiculite, halloysite, kanemite, kenyte, zirconium phosphate, titanium phosphate; and swelling micas such as Li-type fluorotaeniolite, Na-type fluorotaeniolite, Na-type tetrasilicofluoromica, Li-type tetrasilicofluoromica, etc. These may be natural substances or synthetic substances. Of those, preferred are smectite clay minerals such as montmorillonite and hectorite, and swelling synthetic micas such as Na-type tetrasilicofluoromica and Li-type fluorotaeniolite.

The organic onium ions include ammonium ions, phosphonium ions, sulfonium ions, etc. Of those, preferred are ammonium ions and phosphonium ions, and more preferred are ammonium ions. The ammonium ions may be any of primary ammoniums, secondary ammoniums, tertiary ammoniums and quaternary ammoniums.

The primary ammonium ions include decylammonium, dodecylammonium, octadecylammonium, oleylammonium, benzylammonium, etc.

The secondary ammonium ions include methyldodecylammonium, methyloctadecylammonium, etc.

The tertiary ammonium ions include dimethyldecylammonium, dimethyloctadecylammonium, etc.

The quaternary ammonium ions include benzyltrialkylammonium ions such as benzyltrimethylammonium, benzyltriethylammonium, benzyltributylammonium, benzyldimethyldodecylammonium, benzyldimethyloctadecylammonium, benzalkonium; alkyltrimethylammonium ions such as trimethyloctylammonium, trimethyldodecylammonium, trimethyloctadecylammonium; dimethyldialkylammonium ions such as dimethyldioctylammonium, dimethyldidodecylammonium, dimethyldioctadecylammonium; trialkylmethylammonium ions such as trioctylmethylammonium, tridecylmethylammonium; benzetonium ions having two benzene rings, etc.

Apart from these, further mentioned are other ammonium ions derived from aniline, p-phenylenediamine, α-naphthylamine, p-aminodimethylaniline, benzidine, pyridine, piperidine, 6-aminocaproic acid, 11-aminoundecanoic acid, 12-aminododecanoic acid, amino-terminated polyalkylene glycol, etc.

Of those ammonium ions, preferred are trioctylmethylammonium, benzyldimethyldodecylammonium, benzyldimethyloctadecylammonium, benzalkonium, etc. In general, these ammonium ions are available as their mixtures, and the names of the above-mentioned compounds are those of typical compounds including a small amount of their analogues. One or more of these may be used herein either singly or as combined.

Those having a reactive functional group or having high affinity are preferred for use herein. Also preferred are ammonium ions derived from 12-aminododecanoic acid, amino-terminated polyalkylene glycol, etc.

The phyllosilicate for use in the invention, in which the exchangeable cations in the interlayers have been exchanged with organic onium ions, may be prepared by reacting a phyllosilicate having exchangeable cations in its interlayers with organic onium ions in any known method. Concretely, for example, the method comprises ion-exchange reaction in a polar solvent such as water, methanol or ethanol; or comprises directly reacting a phyllosilicate with a liquid or molten ammonium salt.

In the invention, the amount of the organic oniums ion in the phyllosilicate may generally fall between 0.4 and 2.0 equivalents, but preferably between 0.8 and 1.2 equivalents relative to the cation-exchangeable capacity of the phyllosilicate, in view of the dispersibility of the phyllosilicate, the thermal stability in melt, the depression of the vapor and the odor generation in molding.

More preferably, the phyllosilicate is, in addition to being processed with the above-mentioned organic onium salt, further pre-treated with a coupling agent that has a reactive functional group for further increasing the mechanical strength of the resin moldings of the invention. The reactive functional group-having coupling agent includes isocyanate compounds, organic silane compounds, organic titanate compounds, organic borane compounds, epoxy compounds, etc.

In the present invention, the amount of the phyllosilicate with the interlayer exchangeable cations exchanged with organic onium ions may be preferably from 0.1 to 40 parts by weight, but preferably from 0.5 to 30 parts by weight, more preferably from 1 to 10 parts by weight relative to 100 parts by weight of the total of the polylactic acid resin and the polyacetal resin therein.

Also preferably, the resin composition of the invention further contains at least one selected from stabilizer and mold release agent, as giving moldings of better properties.

Any stabilizer generally used for ordinary thermoplastic resin may be used in the invention. Concretely, it includes antioxidant, light stabilizer, formaldehyde scavenger, formic acid scavenger, etc. Preferred are antioxidant and light stabilizer.

The antioxidant usable in the invention includes hindered phenolic compounds, phosphite compounds, thioether compounds, etc.

Examples of hindered phenolic compounds are n-octadecyl 3-(3',5'-di-t-butyl-4'-hydroxyphenyl)propionate, n-octadecyl 3-(3'-methyl-5'-t-butyl-4'-hydroxyphenyl)propionate, n-tetradecyl 3-(3',5'-di-t-butyl-4'-hydroxyphenyl)propionate, 1,6-hexanediol bis-[3-(3,5-di-t-butyl-4-hydroxyphenyl)propionate], 1,4-butanediol bis[3-(3,5-di-t-butyl-4-hydroxyphenyl)propionate], 2,2'-methylenebis-(4-methyl-t-butylphenol), triethylene glycol bis-[3-(3-t-butyl-5-methyl-4-hydroxyphenyl)propionate], tetrakis[methylene-3-(3',5'-di-t-butyl-4'-hydroxyphenyl) propionate]methane, 3,9-bis[2-{3-(3-t-butyl-4-hydroxy-5-methylphenyl)propionyloxy}-1, 1-dimethylethyl]-2,4,8,10-tetraoxaspiro(5,5)undecane, N,N'-bis-3-(3',5'-di-t-butyl-4'-hydroxyphenyl)-propionylhexamethylenediamine, N,N'-tetramethylene-bis-3-(3'-methyl-5'-t-butyl-4'-hydroxyphenol)propionyldiamine, N,N'-bis[3-(3,5-di-t-butyl-4-hydroxyphenol)propionyl]-hydrazine, N-salicyloyl-N'-salicylidenehydrazine, 3-(N-salicyloyl)amino-1,2,4-triazole, N,N'-bis[2-{3-(3,5-di-t-butyl-4-hydroxyphenyl)-propionyloxy}ethyl]oxamide, etc. Preferred are triethylene glycol bis-[3-(3-t-butyl-5-methyl-4-hydroxyphenyl)propionate] and tetrakis[methylene-3-(3',5'-di-t-butyl-4'-hydroxyphenyl)-propionate]methane.

Phosphite compounds are preferably those having at least one P—O bond bonding to an aromatic group. Their specific examples are tris(2,4-di-t-butylphenyl)phosphite, tetrakis (2,4-di-t-butylphenyl-4,4'-biphenylene phosphonite, bis(2,4-di-t-butylphenyl)pentaerythritol diphosphite, bis(2,6-di-t-butyl-4-methylphenyl)pentaerythritol diphosphite, 2,2-methylenebis(4,6-di-t-butylphenyl)octyl phosphite, 4,4'-butylidene-bis(3-methyl-6-t-butylphenyl-di-tridecyl) phosphite, 1,1,3-tris(2-methyl-4-ditridecylphosphite-5-t-butyl-phenyl) butane, tris (mixed mono and di-nonylphenyl) phosphite, tris(nonylphenyl) phosphite, 4,4'-isopropylidenebis(phenyl-dialkyl phosphite), etc. Preferred are tris(2, 4-di-t-butylphenyl) phosphite, 2,2-methylenebis(4,6-di-t-butylphenyl)octyl phosphite, bis(2,6-di-t-butyl-4-methylphenyl)pentaerythritol diphosphite, tetrakis (2,4-di-t-butylphenyl)-4,4-biphenylenephosphonite, etc.

Specific examples of thioether compounds are dilauroylthio dipropionate, ditridecylthio dipropionate, dimyristylthio dipropionate, distearylthio dipropionate, pentaerythritol tetrakis(3-laurylthio propionate), pentaerythritol tetrakis(3-dodecylthio propionate), pentaerythritol tetrakis(3-octadecylthio propionate), pentaerythritol tetrakis(3-myristylthio propionate), pentaerythritol tetrakis(3-stearylthio propionate), etc.

The light stabilizer for use in the invention includes benzophenone compounds, benzotriazole compounds, aromatic benzoate compounds, oxalic acid anilide compounds, cyanoacrylate compounds, hindered amine compounds, etc.

Specific examples of benzophenone compounds are benzophenone, 2,4-dihydrobenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methyl-acryloxyisopropoxybenzophenone), etc.

Specific examples of benzotriazole compounds are 2-(2'-hydroxy-5'-methylphenyl)benzotriazole, 2-(2-hydroxy-3,5-di-tert-amylphenyl)-2H-benzotriazole, 2-(2'-hydroxy-3',5'-di-tert-butylphenyl)benzotriazole, 2-(2'-hydroxy-3',5'-di-tert-butyl-5'-methylphenyl)benzotriazole, 2-(2'-hydroxy-3',5'-di-tert-butylphenyl)-5-chlorobenzotriazole, 2-(2'-hydroxy-3',5'-di-tert-isoamylphenyl)benzotriazole, (2-hydroxy-5-tert-butylphenyl)benzotriazole, 2-[2'-hydroxy-3',5'-bis($\alpha,\alpha$-dimethylbenzyl)phenyl]-benzotriazole, 2-[2'-hydroxy-3',5'-bis-($\alpha,\alpha$-dimethylbenzyl)phenyl]-2H-benzotriazole, 2-(2'-hydroxy-4'-octoxyphenyl)benzotriazole, etc.

Specific examples of aromatic benzoate compounds are alkylphenyl salicylates such as p-t-butylphenyl salicylate, p-octylphenyl salicylate, etc.

Specific examples of oxalic acid anilide compounds are 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, etc.

Specific examples of cyanoacrylate compounds are ethyl 2-cyano-3,3'-diphenylacrylate, 2-ethylhexyl 2-cyano-3,3'-diphenylacrylate, etc.

Specific examples of hindered amine compounds are 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl) carbonate, bis(2,2,6,6-tetramethyl-4-piperidyl) oxalate, bis(2,2,6,6-tetramethyl-4-piperidyl) malonate, bis(2,2,6,6-tetramethyl-4-piperidyl) sebacate, bis (2,2,6,6-tetramethyl-4-piperidyl) adipate, bis(2,2,6,6-tetramethyl-4-piperidyl) terephthalate, 1,2-bis(2,2,6,6-tetramethyl-4-piperidyloxy)-ethane, $\alpha,\alpha'$-bis(2,2,6,6-tetramethyl-4-piperidyloxy)-p-xylene, bis(2,2,6,6-tetramethyl-4-piperidyl) tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene 1,3,5-tricarboxylate, tris(2,2,6,6-tetramethyl-4-piperidyl)benzene-1,3,4-tricarboxylate, 1-[2-{3-(3,5-di-t-butyl-4-hydroxyphenyl)propionyloxy}-butyl]-4-[3-(3,5-di-t-butyl-4-hydroxyphenyl)propionyloxy]-2,2,6,6-tetramethylpiperidine, condensate of 1,2,3,4-butanetetracarboxylic acid, 1,2,2,6,6-pentamethyl-4-piperidinol and $\beta,\beta,\beta',\beta'$-tetramethyl-3,9-[2,4,8,10-tetroxaspiro(5,5)-undecane]diethanol, etc.

The formaldehyde scavenger for use in the invention includes formaldehyde-reactive nitrogen-containing polymers and compounds, amino-substituted formaldehyde-reactive nitrogen atom-containing compounds, etc.

Specific examples of formaldehyde-reactive nitrogen-containing polymers and compounds are polyamide resins such as nylon 46, nylon 6, nylon 66, nylon 610, nylon 612, nylon 12 etc., and their polymers such as nylon 6/6-6/6-10, nylon 6/6-12 etc. Acrylamide and its derivatives, and copolymers of acrylamide and its derivatives with any other vinyl monomers may be poly-$\beta$-alanine copolymers that are obtained through polymerization of acrylamide and its derivatives with any other vinyl monomer in the presence of a metal alcoholate.

Specific examples of amino-substituted formaldehyde-reactive nitrogen atom-containing compounds are 2,4-diamino-sym-triazine, 2,4,6-triamino-sym-triazine, N-butylmelamine, N-phenylmelamine, N,N-diphenylmelamine, N,N-diallylmelamine, N,N',N''-triphenylmelamine, melem, mellon, melam, benzoguanamine
(2,4-diamino-6-phenyl-sym-triazine), acetoguanamine
(2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N,N',N'-tetracyanoethylbenzoguanamine, succinoguanamine, melamine, ethylenedimelamine, triguanamine, melamine cyanurate, ethylenedimelamine cyanurate, triguanamine cyanurate, ammeline, acetoguanamine, benzoguanamine, etc.

The formic acid scavenger for use in the invention may be any of the above-mentioned amino-substituted triazines, polycondensates of the amino-substituted triazines with formaldehyde such as melamine-formaldehyde polycondensate, etc. For it, also usable are alkali metal or alkaline earth metal hydroxides, inorganic acid salts, carboxylic acid salts and alkoxides etc. For example, they are hydroxides, carbonates, phosphates, silicates, borates, carboxylates with sodium, potassium, magnesium, calcium or barium etc. The carboxylic acid is preferably a saturated or unsaturated aliphatic carboxylic acid having from 10 to 36-carbon atoms. Preferably, the carboxylic acid is substituted with a hydroxyl group. The aliphatic carboxylic acid includes capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linolic acid, linolenic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid, 10-hydroxy-8-octadecanoic acid, dl-erythro-9,10-dihydroxyoctadecanoic acid, etc. Above all, preferred are calcium salts of difatty acids in which the fatty acid has from 12 to 22 carbon atoms. Their specific examples are calcium dimyristate, calcium dipalmitate, calcium diheptadecylate, calcium distearate, calcium (myristate-palmitate), calcium (myristate-stearate), calcium (palmitate-stearate), etc.

In the invention, one or more of the above-mentioned stabilizers may be used either singly or as combined.

The amount of the stabilizer is preferably from 0.01 parts by weight to 3 parts by weight, more preferably from 0.03 parts by weight to 2 parts by weight relative to 100 parts by weight of the total of the polylactic acid resin and the polyacetal resin in the composition.

Containing a polylactic acid resin, a polyacetal resin and a stabilizer, the resin composition of the invention is superior to the individual resin mixed with a stabilizer, as its moldability is very good and it gives moldings of better mechanical properties, heat resistance and weather resistance.

The mold release agent for use in the invention may be any and every one generally used for ordinary thermoplastic resin. Concretely, it includes fatty acids, metal salts of fatty acids, oxy-fatty acids, esters of fatty acids, partially-saponified esters of fatty acids, paraffins, low-molecular polyolefins, fatty acid amides, alkylenebis-fatty acid amides, aliphatic ketones, lower alcohol esters of fatty acids, polyalcohol esters of fatty acids, polyglycol esters of fatty acids, modified silicones, etc.

Fatty acids are preferably those having from 6 to 40 carbon atoms. Concretely, they are oleic acid, lauric acid, stearic acid, hydroxystearic acid, behenic acid, arachidonic acid, linolic acid, linolenic acid, ricinoleic acid, palmitic acid, stearic acid, montanic acid and their mixtures, etc. Metal salts of fatty acids are preferably alkali metal or alkaline earth metal salts of fatty acids having from 6 to 40 carbon atoms. Concretely, they are calcium stearate, sodium montanate, calcium montanate, etc. oxy-fatty acids are 1,2-oxystearic acid, etc. Fatty acid esters include stearates, oleates, linolates, linolenates, adipates, behenates, arachidates, montanates, isostearates, and esters of polymer acids. Partially-saponified esters of fatty acids are, for example, partially-saponified montanates, etc. Paraffins are preferably those having at least 18 carbon atoms, including liquid paraffin, natural paraffin, microcrystalline wax, petrolatum, etc. Low-molecular polyolefins are preferably those having, for example, a molecular weight of at most 5000. Concretely, they are polyethylene wax, maleic acid-modified polyethylene wax, oxidized polyethylene wax, chlorinated polyethylene wax, polypropylene wax, etc. Fatty acid amides are preferably those having at least 6 carbon atoms, concretely including oleamide, erucamide, behenamide, etc. Alkylenebis-fatty acid amides are preferably those having at least 6 carbon atoms, concretely including methylenebisstearamide, ethylenebisstearamide, N,N-bis(2-hydroxyethyl) stearylamine, etc. Aliphatic ketones are, for example, higher aliphatic ketones. Lower alcohol esters of fatty acids are preferably those having at least 6 carbon atoms, and includes ethyl stearate, butylstearate, ethyl behenate, rice wax, etc. Polyalcohol esters of fatty acids include glycerin monostearate, pentaerythritol monostearate, pentaerythritol tetrastearate, pentaerythritol adipate stearate, dipentaerythritol adipate stearate, sorbitan monobehenate, etc. Polyglycol esters of fatty acids include polyethylene glycol fatty acid esters, and polypropylene glycol fatty acid esters. Modified silicones include methylstyryl-modified silicone, polyether-modified silicone, higher fatty acid alkoxy-modified silicone, higher fatty acid-containing silicone, higher fatty acid ester-modified silicone, methacrylic-modified silicone, fluorine-modified silicone, etc.

Of those mentioned above, preferred for use herein are fatty acids, metal salts of fatty acids, oxy-fatty acids, fatty acid esters, partially-saponified esters of fatty acids, paraffins, low-molecular polyolefins, aliphatic amides, and alkylenebis-fatty acid amides.

Above all, especially preferred are montanates, partially-saponified montanates, polyethylene wax, oxidized polyethylene wax, sorbitan fatty acid esters, erucamide, and ethylenebisstearamide. More preferred are montanates, partially-saponified montanates, polyethylene wax, erucamide and ethylenebisstearamide.

In the invention, one or more of the above-mentioned mold release agent may be used either singly or as combined.

The amount of the mold release agent is preferably from 0.01 parts by weight to 3 parts by weight, more preferably from 0.03 parts by weight to 2 parts by weight relative to 100 parts by weight of the total of the polylactic acid resin and the polyacetal resin.

Containing a polylactic acid resin, a polyacetal resin and a mold release agent, the resin composition of the invention is superior to the individual resin mixed with a lubricant, as its moldability is very good and it gives moldings of better mechanical properties, heat resistance and surface properties.

Also preferably, the resin composition of the invention additionally contains a carboxyl group-reactive end-capping agent that is kneaded in melt therein, and it gives moldings of better properties.

Not specifically defined, the carboxyl group-reactive end-capping agent for use in the invention may be any compound capable of capping the carboxyl end group of polymer and generally used as a capping agent of carboxyl group for polymer. In the invention, the carboxyl group-reactive end-capping agent of the type acts not only to cap the end group of the polylactic acid resin but also to cap the carboxyl group of acidic low-molecular compounds such as lactic acid and formic acid that are formed through pyrolysis or hydrolysis of the polylactic acid resin and the polyacetal resin. For the end-capping agent for use herein, preferred are compounds capable of capping the hydroxyl end group to be formed acidic low-molecular compounds through pyrolysis.

The carboxyl group-reactive end-capping agent of the type is preferably at least one compound selected from epoxy compounds, oxazoline compounds, oxazine compounds and carbodiimide compounds.

The epoxy compounds usable herein for the carboxyl group-reactive end-capping agent are preferably glycidyl ether compounds, glycidyl ester compounds, glycidylamine compounds, glycidylimide compounds and alicyclic epoxy compounds.

Examples of the glycidyl ether compounds are butyl glycidyl ether, stearyl glycidyl ether, allyl glycidyl ether, phenyl glycidyl ether, o-phenylphenyl glycidyl ether, ethyleneoxide-lauryl alcohol glycidyl ether, ethyleneoxide-phenol glycidyl ether, ethylene glycol diglycidyl ether, polyethylene glycol diglycidyl ether, propylene glycol diglycidyl ether, polypropylene glycol diglycidyl ether, neopentylglycol diglycidyl ether, polytetramethylene glycol diglycidyl ether, cyclohexanedimethanol diglycidyl ether, glycerol triglycidyl ether, trimethylolpropane triglycidyl ether, pentaerythritol polyglycidyl ether; bisphenol A diglycidyl ether-type epoxy resins, bisphenol F diglycidyl ether-type epoxy resins, bisphenol S diglycidyl ether-type epoxy resins and others that are obtained through condensation of bisphenols such as 2,2-bis(4-hydroxyphenyl)propane, 2,2-bis(4-hydroxyphenyl)methane, bis(4-hydroxyphenyl) sulfone or the like with epichlorohydrin. Above all, preferred are bisphenol A diglycidyl ether-type epoxy resins.

Examples of the glycidyl ester compounds are glycidyl benzoate, glycidyl p-toluate, glycidyl cyclohexanecarboxylate, glycidyl stearate, glycidyl laurate, glycidyl palmitate, glycidyl versatate, glycidyl oleate, glycidyl linolate, glycidyl linolenate, diglycidyl terephthalate, diglycidyl isophthalate, diglycidyl phthalate, diglycidyl naphthalenedicarboxylate, diglycidyl bibenzoate, diglycidyl methylterephthalate, diglycidyl hexahydrophthalate, diglycidyl tetrahydrophthalate, diglycidyl cyclohexanedicarboxylate, diglycidyl adipate, diglycidyl succinate, diglycidyl sebacate, diglycidyl dodecan-dioate, diglycidyl octadecanedicarboxylate, triglycidyl trimellitate, tetraglycidyl pyromellitate, etc. Above all, preferred are glycidyl benzoate and glycidyl versatate.

Examples of the glycidylamine compounds are tetraglycidylaminodiphenylmethane, triglycidyl-paraminophenol, triglycidyl-metaminophenol, diglycidylaniline, diglycidyltoluidine, tetraglycidylmetaxylenediamine, diglycidyltribromoaniline, tetraglycidylbisaminomethylcyclohexane, triglycidyl cyanurate, triglycidyl isocyanurate, etc.

Examples of the glycidylimide compounds are N-glycidylphthalimide, N-glycidyl-4-methylphthalimide, N-glycidyl-4,5-dimethylphthalimide, N-glycidyl-3-methylphthalimide, N-glycidyl-3,6-dimethylphthalimide, N-glycidyl-4-ethoxyphthalimide, N-glycidyl-4-chlorophthalimide, N-glycidyl-4,5-dichlorophthalimide, N-glycidyl-3,4,5,6-tetrabromophthalimide, N-glycidyl-4-n-butyl-4,5-bromophthalimide, N-glycidylsuccinimide, N-glycidylhexahydrophthalimide, N-glycidyl-1,2,3,6-tetrahydrophthalimide, N-glycidylmaleimide, N-glycidyl-α,β-dimethylsuccinimide, N-glycidyl-α-ethylsuccinimide, N-glycidyl-α-propylsuccinimide, N-glycidylbenzamide, N-glycidyl-p-methylbenzamide, N-glycidylnaphthamide, N-glycidylstearamide, etc. Above all, preferred is N-glycidylphthalimide.

Examples of the alicyclic epoxy compounds are 3,4-epoxycyclohexylmethyl-3,4-epoxycyclohexylcarboxylate, bis(3,4-epoxycyclohexylmethyl) adipate, vinylcyclohexenediepoxide, N-methyl-4,5-epoxycyclohexane-1,2-dicarboimide, N-ethyl-4,5-epoxycyclohexane-1,2-dicarboimide, N-phenyl-4,5-epoxycyclohexane-1,2-dicarboimide, N-naphthyl-4,5-epoxycyclohexane-1,2-dicarboimide, N-tolyl-3-methyl-4,5-epoxycyclohexane-1,2-dicarboimide, etc.

Also usable herein are other epoxy compounds, for example, epoxy-modified fatty acid glycerides such as epoxidated soybean oil, epoxidated linseed oil, epoxidated whale oil; phenol-novolakepoxyresins, cresol-novolakepoxyresins, etc.

Examples of the oxazoline compounds that are usable as the carboxyl group-reactive end-capping agent in the invention are 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphenoxy-2-oxazoline, 2-o-propylphenoxy-2-oxazoline, 2-o-phenyloxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline, 2-p-phenylphenyl-2-oxazoline, 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4'-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethyleenbis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline), 2,2'-diphenylenebis(2-oxazoline), etc. In addition, polyoxazoline compounds that contains monomer units of any of the above-mentioned compounds are also usable herein.

Examples of the oxazine compounds that are usable as the carboxyl group-reactive end-capping agent in the invention are 2-methoxy-5,6-dihydro-4H-1,3-oxazine, 2-ethoxy-5,6-dihydro-4H-1,3-oxazine, 2-propoxy-5,6-dihydro-4H-1,3-oxazine, 2-butoxy-5,6-dihydro-4H-1,3-oxazine, 2-pentyloxy-5,6-dihydro-4H-1,3-oxazine, 2-hexyloxy-5,6-dihydro-4H-1,3-oxazine, 2-heptyloxy-5,6-dihydro-4H-1,3-oxazine, 2-octyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-cyclohexyloxy-5,6-dihydro-4H-1,3-oxazine, 2-allyloxy-5,6-dihydro-4H-1,3-oxazine, 2-methallyloxy-5,6-dihydro-4H-1,3-oxazine, 2-crotyloxy-5,6-dihydro-4H-1,3-oxazine; and further 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine), 2,2'-p,p'-diphenylenebis(5,6-dihydro-4H-1,3-oxazine), etc. In addition, polyoxazine compounds that contain monomer units of any of the above-mentioned compounds are also usable herein.

Of the above-mentioned oxazoline compounds and oxazine compounds, preferred are 2,2'-m-phenylenebis(2-oxazoline) and 2,2'-p-phenylenebis(2-oxazoline).

The carbodiimide compounds that are usable as the carboxyl group-reactive end-capping agent in the invention are compounds having at least one carbodiimido group of (—N=C=N—) in the molecule, and they are produced, for example, by heating organic isocyanates for decarboxylation in the presence of a suitable catalyst.

Examples of the carbodiimide compounds are mono or dicarbodiimide compounds such as diphenylcarbodiimide, dicyclohexylcarbodiimide, di-2,6-dimethylphenylcarbodiimide, diisopropylcarbodiimide, dioctyldecylcarbodiimide, di-o-tolylcarbodiimide, di-p-tolylcarbodiimide, di-p-nitrophenylcarbodiimide, di-p-aminophenylcrbodiimide, di-p-hydroxyphenylcarbodiimide, di-p-chlorophenylcarbodiimide, di-o-chlorophenylcarbodiimide, di-3,4-dichlorophenylcarbodiimide, di-2,5-dichlorophenylcarbodiimide, p-phenylene-bis-o-toluoylcabodiimide, p-phenylene-bisdicyclohexylcarbodiimide, p-phenylene-bis-di-p-chlorophenylcarbodiimide, 2,6,2',6'-tetraisopropyldiphenylcarbodiimide, hexamethylene-bis-cyclohexylcarbodiimide, ethylene-bis-diphenylcarbodiimide, ethylene-bis-dicyclohexylcarbodiimide, N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N,N'-di-2,6-diisopropylphenylcarbodiimide, N,N'-di-2,6-di-tert-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, N,N'-benzylcarbodiimide, N-octadeyl-N'-phenylcarbodiimide, N-benzyl-N'-phenylcarbodiimide, N-octadecyl-N'-tolylcarbodiimide, N-cyclohexyl-N'-tolylcarbodiimide, N-phenyl-N'-tolylcarbodiimide, N-benzyl-N'-tolylcarbodiimide, N,N'-di-o-ethylphenylcarbodiimide, N,N'-di-p-ethylphenylcarbodiimide, N,N'-di-o-isopropylphenylcarbodiimide, N,N'-di-p-isopropylphenylcarbodiimide, N,N'-di-o-isobutylphenylcarbodiimide, N,N'-di-p-isobutylphenylcarbodiimide, N,N'-di-2,6-diethylphenylcarbodiimide, N,N'-di-2-ethyl-6-isopropylphenylcarbodiimide, N,N'-di-2-isobutyl-6-isopropylphenylcarbodiimide, N,N'-di-2,4,6-trimethylphenylcarbodiimide, N,N'-di-2,4,6-triisopropylphenylcarbodiimide, N,N'-di-2,4,6-triisobutylphenylcarbodiimide; polycarbodiimides such as poly(1,6-hexamethylenecarbodiimide), poly(4,4'-methylenebiscyclohexylcarbodiimide), poly(1,3-cyclohexylenecarbodiimide), poly(1,4-cyclohexylenecarbodiimide), poly(4,4'-diphenylmethanecarbodiimide), poly(3,3'-dimethyl-4,4'-diphenylmethanecarbodiimide), poly(naphthylenecarbodiimide), poly(p-phenylenecarbodiimide), poly(m-phenylenecarbodiimide), poly(tolylcarbodiimide), poly(diisopropylcarbodiimide), poly(methyl-diisopropylphenylenecarbodiimide), poly(triethylphenylenecarbodiimide), poly(triisopropylphenylenecarbodiimide), etc. Above all, preferred are N,N'-di-2,6-diisopropylphenylcarbodiimide, and 2,6,2',6'-tetraisopropyldiphenylcarbodiimide.

One or more may be optionally selected from the above-mentioned, carboxyl group-reactive end-capping agent for use herein.

In the resin composition of the invention, the carboxyl end groups and the acidic low-molecular compounds may be suitably capped in accordance with the use of the moldings of the composition. Concretely, the degree of capping of the carboxyl end groups and the acidic low-molecular compounds is preferably at most 10 equivalents/$10^6$ kg, in terms of the acid concentration, more preferably at most 5 equivalents/$10^6$ kg, even more preferably at most 1 equivalent/$10^6$ kg, in view of the hydrolysis resistance of the moldings. The acid concentration of the polymer composition may be determined by dissolving the polymer composition in a suitable solvent and titering the resulting solution with a solution of an alkali compound such as sodium hydroxide having a known concentration, or may be determined through NMR.

The amount of the carboxyl group-reactive end-capping agent to be in the resin composition of the invention is preferably from 0.01 parts by weight to 10 parts by weight, more preferably from 0.05 parts by weight to 5 parts by weight relative to 100 parts by weight of the total of the polylactic acid resin and the polyacetal resin in the composition.

Also preferably, the resin composition of the invention additionally contains a reaction catalyst for the carboxyl group-reactive end-capping agent therein. The reaction catalyst as referred to herein is a compound having the ability to promote the reaction between the carboxyl group-reactive end-capping agent and the carboxyl group at the polymer end or in the acidic low-molecular compounds, and is preferably a compound that is effective in promoting the reaction even when a small amount of it is added to the composition. Examples of the compound are alkali metal compounds, alkaline earth metal compounds, tertiary amine compounds, imidazole compounds, quaternary ammonium salts, phosphine compounds, phosphonium salts, phosphates, organic acids and Lewis acids. Their specific examples are alkali metal compounds such as sodium hydroxide, potassium hydroxide, lithium hydroxide, cesium hydroxide, sodium hydrogencarbonate, potassium hydrogencarbonate, sodium carbonate, potassium carbonate, lithium carbonate, sodium acetate, potassium acetate, lithium acetate, sodium stearate, potassium stearate, lithium stearate, sodium borohydride, lithiumborohydride, sodium phenylboronate, sodium benzoate, potassium benzoate, lithium benzoate, disodium hydrogenphosphate, dipotassium hydrogenphosphate, dilithium hydrogenphosphate, disodium salt of bisphenol A, dipotassium salt thereof, dilithium salt thereof, sodium salt of phenol, potassium salt thereof, lithium salt thereof, cesium salt thereof; alkaline earth metal compounds such as calcium hydroxide, barium hydroxide, magnesium hydroxide, strontium hydroxide, calcium hydrogencarbonate, barium carbonate, magnesium carbonate, strontium carbonate, calcium acetate, barium acetate, magnesium acetate, strontium acetate, calcium stearate, magnesium stearate, strontium stearate; tertiary amines such as triethylamine, tributylamine, trihexylamine, triamylamine, triethanolamine, dimethylaminoethanol, triethylenediamine, dimethylphenylamine, dimethylbenzylamine, 2-(dimethylaminomethyl)phenol, dimethylaniline, pyridine, picoline, 1,8-diazabicyclo(5,4,0)undecene-7; imidazole compounds such as 2-methylimidazole, 2-ethylimidazole, 2-isopropylimidazole, 2-ethyl-4-methylimidazole, 4-phenyl-2-methylimidazole; quaternary ammonium salts such as tetramethylammonium chloride, tetraethylammonium chloride, tetrabutylammonium bromide, trimethylbenzylammonium chloride, triethylbenzylammonium chloride, tripropylbenzylammonium chloride, N-methylpyridinium chloride; phosphine compounds such as trimethylphosphine, triethylphosphine, tributylphosphine, trioctylphosphine; phosphonium salts such as tetramethylphosphonium bromide, tetrabutylphosphonium bromide, tetraphenylphosphonium bromide, ethyltriphenylphosphonium bromide, triphenylbenzylphosphonium bromide; phosphates such as trimethyl phosphate, triethyl phosphate, tributyl phosphate, trioctyl phosphate, tributoxyethyl phosphate, triphenyl phosphate, tricresyl phosphate, trixylenyl phosphate, cresyldiphenyl phosphate, octyldiphenyl phosphate, tri(p-hydroxy)phenyl phosphate, tri(p-methoxy)phenyl phosphate; organic acids such as oxalic acid, p-toluenesulfonic acid, dinonylnaphthalenedisulfonic acid, dodecylbenzenesulfonic acid; Lewis acids such as boron trifluoride, aluminium tetrachloride, titanium tetrachloride, tin tetrachloride. One or more of these may be used herein. Above all, preferred are alkali metal compounds, alkaline earth metal compounds and phosphates; and more preferred are organic salts with alkali metals or alkaline earth metals. Especially preferred compounds are sodium stearate, potassium stearate, calcium stearate, magnesium stearate, sodium benzoate, sodium acetate, potassium acetate, calcium acetate and magnesium acetate. Further preferred are organic salts having at least 6 carbon atoms with alkali metals or alkaline earth metals. Preferably one or more of sodium stearate, potassium stearate, calcium stearate, magnesium stearate and sodium benzoate are used herein.

The amount of the reaction catalyst to be used is not specifically defined. Preferably, it is from 0.001 to 1 part by weight, more preferably from 0.01 to 0.1 parts by weight, most preferably from 0.02 to 0.1 parts by weight relative to 100 parts by weight of the total of the polylactic acid resin and the polyacetal resin in the resin composition.

The resin composition of the invention may contain any thermoplastic resin, for example, polyolefin resin such as polyethylene rein or polypropylene resin, polystyrene resin, polyurethane resin, chloropolyethylene resin, choropolypropylene resin, aromatic and aliphatic polyketone resin, fluororesin, polyphenylene sulfide resin, polyether-ether ketone resin, polyimide resin, thermoplastic starch resin, AS resin, ABS resin, AES resin, ACS resin, polyvinyl chloride resin, polyvinylidene chloride resin, vinyl ester resin, polyurethane resin, MS resin, polycarbonate resin, polyarylate resin, polysulfone resin, polyether sulfone resin, phenoxy resin, polyphenylene oxide resin, poly-4-methylpenten-1, polyetherimide resin, cellulose acetate resin, polyvinyl alcohol resin. The amount of the additional resin is preferably from 1 part by weight to 100 parts by weight, more preferably from 3 parts by weight to 70 parts by weight, even more preferably from 5 parts by weight to 50 parts by weight relative to 100 parts by weight of the total of the polylactic acid resin and the polyacetal resin in the composition.

The resin composition may also contain thermosetting resin such as phenolic resin, melamine resin, polyester resin, silicone resin, epoxy resin, etc.

Not interfering with the object of the invention, the resin composition may contain lubricant, flame retardant (bromine-containing flame retardant, phosphorus-containing flame retardant, antimony compound, etc), and colorant such as dye and pigment.

For producing the composition of the invention, for example, preferably employed is a method of pre-blending a polylactic acid resin, a polyacetal resin and optionally other additives and then uniformly melting and kneading them in a single or double-screw extruder at a temperature not lower than the melting point, or mixing the component in solution and then removing the solvent from the mixture.

EXAMPLES

The invention is described in more detail with reference to the following Examples, which, however, are not to restrict the scope of the invention.

Example 1

Examples of the Invention and Comparative Examples

Poly-L-lactic acid resin having a D-isomer content of 1.2% and a PMMA-calibrated weight-average molecular weight of 160,000, and polyacetal copolymer (Toray's AMILUS S731) having a melt index measured at 190° C. of 27 g/10 min and having a melting point of 170° C. were mixed in the ratio as in Table 1, and kneaded in melt in a 40 mmφ single-screw extruder at a temperature of 210° C. and a revolution of 50 rpm to obtain a resin composition.

Using a differential scanning calorimeter (DSC, by Perkin Elmer), the glass transition temperature (Tg) of the resin composition and the crystallization temperature (Tc) of the polyacetal resin at cooling were measured driven at a heating and cooling rate of 20° C./min. The data are given in Table 1. Tg lowers with the increase in the polyacetal resin content of the composition. Tc lowers with the increase in the polylactic acid resin content of the composition.

The composition obtained herein was heated at 200° C. for 2 minutes, then pressed and thereafter cooled in water with ice to obtain a film having a thickness of 100 μm. The transparency of the film was judged through visual observation. The result is given in Table 1. Test Nos. 1-1 and 1-7 are comparative data. The film having a composition ratio polylactic acid/polyacetal of 90/10, the film having a composition ratio of 70/30 and the film of polylactic acid alone have high transparency. However, the other films are opaque.

This process gives transparent films when the polyacetal content of the resin composition is not higher than 30%.

The light transmittance and the haze value of the films obtained herein were measured according to JIS-K6714, using an integrating-sphere H.T.R. meter. The data are given in Table 2. The light transmittance of the films having a composition ratio of 90/10, 80/20 or 70/30 and the film of polylactic acid alone was at least 95%, and the haze value thereof was at most 10%. The light transmittance of the films having a composition ratio of 50/50 or 30/70 was at least 90%, and the haze value thereof was at most 50%; but the light transmittance of the film of polyacetal alone was lower than 90% and the haze value thereof was 82%.

In addition, the resin composition obtained herein was injection-molded at a cylinder temperature of 210° C. and a mold temperature of 40° C. to obtain tensile test pieces. These were tested for tensile strength, according to ASTM-D638. Further, the test pieces were heated at 140° C. for 1 hour, and visually checked for the degree of deformation. The results are given in Table 3. Compared with the individual resin alone, the resin composition of the invention gives moldings of better mechanical properties and heat resistance.

TABLE 1

|  |  | 1-1 | 1-2 | 1-3 | 1-4 | 1-5 | 1-6 | 1-7 |
| --- | --- | --- | --- | --- | --- | --- | --- | --- |
| Polylactic Acid | wt. pt. | 100 | 90 | 80 | 70 | 50 | 30 | 0 |
| Polyacetal | wt. pt. | 0 | 10 | 20 | 30 | 50 | 70 | 100 |
| Tg | ° C. | 67 | 58 | 48 | unclear | unclear | unclear | unclear |
| Tc | ° C. | — | 119 | 124 | 130 | 134 | 138 | 140 |
| Film Transparency | visual observation | transparent | transparent | transparent | transparent | opaque | opaque | opaque |

TABLE 2

|  |  | 1-1 | 1-2 | 1-3 | 1-4 | 1-5 | 1-6 | 1-7 |
|---|---|---|---|---|---|---|---|---|
| Polylactic Acid | wt. pt. | 100 | 90 | 80 | 70 | 50 | 30 | 0 |
| Polyacetal | wt. pt. | 0 | 10 | 20 | 30 | 50 | 70 | 100 |
| Film Transparency | | | | | | | | |
| Light Transmittance | % | 96 | 96 | 96 | 96 | 92 | 91 | 88 |
| Haze | % | 5 | 6 | 6 | 8 | 24 | 45 | 82 |

TABLE 3

|  |  | 1-1 | 1-2 | 1-3 | 1-4 | 1-5 | 1-6 | 1-7 |
|---|---|---|---|---|---|---|---|---|
| Polylactic Acid | wt. pt. | 100 | 90 | 80 | 70 | 50 | 30 | 0 |
| Polyacetal | wt. pt. | 0 | 10 | 20 | 30 | 50 | 70 | 100 |
| Strength | MPa | 66 | 65 | 64 | 65 | 56 | 56 | 50 |
| Modulus of Elasticity | GPa | 2.4 | 2.5 | 2.6 | 2.6 | 2.5 | 2.4 | 2.3 |
| Elongation at break | % | 3 | 3 | 3 | 3 | 14 | 23 | 50 |
| Deformation after heating | visual observation | much deformed* | not deformed | not deformed | not deformed | not deformed | not deformed | not deformed |

*Greatly warped in the width direction.

Example 2

Examples of the Invention and Comparative Examples

Resin compositions were produced in the same manner as in Example 1, except that poly-L-lactic acid resin having a D-isomer content of 1.2% and a PMMA-calibrated weight-average molecular weight of 280,000, and polyacetal copolymer (Toray's AMILUS S761) having a melt index measured at 190° C. of 9 g/10 min and having a melting point of 170° C. were mixed in the ratio as in Table 4. Tg of the thus-obtained resin composition and Tc of the polyacetal resin in the composition were measured also in the same manner as in Example 1. The data are given in Table 4. Test Nos. 2-1 and 2-5 are comparative data. Like in Example 1, Tg and Tc are seen to lower.

The resin composition was melt-spun at a spinning temperature of 210° C. and a spinning rate of 1000 m/min. All the resin composition were well spun but the polyacetal resin alone (2-5) was not. Spinning the polyacetal resin alone gave many thread breakage.

TABLE 4

|  |  | 2-1 | 2-2 | 2-3 | 2-4 | 2-5 |
|---|---|---|---|---|---|---|
| Polylactic Acid | wt. pt. | 100 | 80 | 50 | 20 | 0 |
| Polyacetal | wt. pt. | 0 | 20 | 50 | 80 | 100 |
| Tg | ° C. | 68 | 50 | unclear | unclear | unclear |
| Tc | ° C. | — | 127 | 135 | 138 | 139 |

Example 3

Examples of the Invention and Comparative Examples

Resin compositions were produced in the same manner as in Example 1, except that poly-L-lactic acid resin having a D-isomer content of 8% and a PMMA-calibrated weight-average molecular weight of 180,000, and polyacetal copolymer (Toray's AMILUS S731) having a melt index measured at 190° C. of 27 g/10 min and having a melting point of 170° C. were mixed in the ratio as in Table 5. Tg of the thus-obtained resin composition and Tc of the polyacetal resin in the composition were measured also in the same manner as in Example 1. The data are given in Table 5. Test Nos. 3-1 and 3-5 are comparative data. Like in Example 1, Tg and Tc are seen to lower, but the degree of depression is small.

TABLE 5

|  |  | 3-1 | 3-2 | 3-3 | 3-4 | 3-5 |
|---|---|---|---|---|---|---|
| Polylactic Acid | wt. pt. | 100 | 80 | 50 | 20 | 0 |
| Polyacetal | wt. pt. | 0 | 20 | 50 | 80 | 100 |
| Tg | ° C. | 62 | 50 | unclear | unclear | unclear |
| Tc | ° C. | — | 130 | 138 | 139 | 140 |

Example 4

Comparative Example 80 parts by weight of poly-L-lactic acid resin having a D-isomer content of 1.2% and a PMMA-calibrated weight-average molecular weight of 160,000 and 20 parts by weight of nylon 6 (Toray AMILAN CM100) were kneaded in melt in a 40 mmφ single-screw extruder at a temperature of 240° C. and a revolution of 50 rpm to obtain a resin composition.

Tg of the poly-L-lactic acid resin in the thus-obtained resin composition was 66° C. Accordingly, the poly-L-lactic acid resin will be immiscible with nylon 6. The composition obtained herein was heated at 230° C. for 2 minutes, then pressed, and thereafter cooled in water with ice to obtain a film having a thickness of 100 μm. The film was opaque. Its light transmittance was 69%, and its haze was 92%.

Example 5

Comparative Example 80 parts by weight of polyacetal copolymer (Toray's AMILUS S731) having a melt index measured at 190° C. of 27 g/10 min and having a melting point of 170° C., and 20 parts by weight of polymethyl methacrylate resin (Sumitomo Chemical's SUMIPEX LG35) having a melt index measured at 230° C. of 35 g/10 min were kneaded in melt in a 40 mmφ single-screw extruder at a temperature of 200° C. and a revolution of 50 rpm to obtain a resin composition.

Tc of the polyacetal resin in the thus-obtained resin composition was 140° C. Accordingly, the polyacetal resin will be immiscible with the polymethyl methacrylate resin. The composition obtained herein was heated at 200° C. for 2 minutes, then pressed, and thereafter cooled in water with ice to obtain a film having a thickness of 100 µm. The film was opaque. Its light transmittance was 59%, and its haze was 90%.

Example 6

Examples of the Invention

The resin compositions prepared by mixing the polylactic acid resin and the polyacetal resin in Examples 1 to 3 were separately ground. One g of the powder was stirred in 100 ml of water at 50° C. for 6 hours to extract formaldehyde. This was determined according to an acetylacetone method, and the data obtained are given in Table 6. The formaldehyde content of every composition was smaller than 250 ppm relative to the polyacetal resin.

TABLE 6

|  |  | 1-2 | 1-3 | 1-4 | 1-5 | 1-6 | 2-2 | 2-3 | 2-4 | 3-2 | 3-3 | 3-4 |
|---|---|---|---|---|---|---|---|---|---|---|---|---|
| Polylactic Acid | wt. pt. | 90 | 80 | 70 | 50 | 30 | 80 | 50 | 20 | 80 | 50 | 20 |
| Polyacetal | wt. pt. | 10 | 20 | 30 | 50 | 70 | 20 | 50 | 80 | 20 | 50 | 80 |
| Formaldehyde Content | ppm | 70 | 50 | 90 | 50 | 30 | 30 | 40 | 40 | 90 | 70 | 80 |

Example 7

Comparative Example 50 parts by weight of poly-L-lactic acid resin having a D-isomer content of 1.2% and a PMMA-calibrated weight-average molecular weight of 160,000, 50 parts by weight of polyacetal copolymer (containing 1.5% by weight of oxyalkylene units with two neighboring carbon atoms in the backbone chain) having a melt index measured at 190° C. of 9 g/10 min and having a melting point of 170° C., and 0.001 parts by weight of aqueous 30 wt. % formalin were mixed, and kneaded in melt in a 40 mmφ single-screw extruder at a temperature of 200° C. and a revolution of 50 rpm to obtain a resin composition. This foamed, and its formaldehyde content measured in the same manner as in Example 6 was 500 ppm. While worked, it much foamed with odor and could not be formed into films or moldings. Therefore, its properties could not be evaluated.

Example 8

Comparative Example

A resin composition having a formaldehyde content of 500 ppm was produced in the same manner as in Example 7, for which, however, used was poly-L-lactic acid resin having a D-isomer content of 8% and a PMMA-calibrated number-average molecular weight of 160,000. While worked, it much foamed with odor and could not be formed into films or moldings. Therefore, its properties could not be evaluated.

Example 9

Examples of the Invention and Comparative Examples

Poly-L-lactic acid resin having a D-isomer content of 2% and a PMMA-calibrated weight-average molecular weight of 170,000, polyacetal copolymer (Toray's AMILUS S731) having a melt index measured at 190° C. of 27 g/10 min and having a melting point of 170° C., and a crystallization promoter as in Table 7 were mixed in the ratio as in Table 7, and kneaded in melt in a 40 mmφ single-screw extruder at a temperature of 210° C. and a revolution of 50 rpm to obtain a resin composition.

The crystallization promoters used herein are as follows:
A-1: Polyethylene glycol (by Katayama Chemical, molecular weight 2000).
A-2: Polybutylene adipate (by Sanyo Chemical, molecular weight 1000).
A-3: Neopentylglycol dibenzoate (by Sanyo Chemical).
B-1: Talc (by Fuji Talc, LMS300).
B-2: Synthetic mica (by Corp Chemical, ME-100).
B-3: Barium stearate (by Katayama Chemical).

Using DSC (by Seiko Electronics), the glass transition temperature (Tg) of the resin composition and the crystallization temperature (Tc) of the polyacetal resin at cooling were measured driven at a heating and cooling rate of 20° C./min. The data are given in Table 7. The crystallization temperature of polyacetal resin alone at cooling was 140° C.

The resin composition obtained herein by mixing the polylactic acid resin and the polyacetal resin was ground. One g of the resulting powder was stirred in a predetermined amount of water at 50° C. for 6 hours to extract formaldehyde. This was determined according to an MBTH colorimetry method using, as the essential reagent, 3-methyl-2-benzothiazolinonehydrazone hydrochloride. The data obtained are given in Table 7.

In addition, the resin composition obtained herein was injection-molded at a cylinder temperature of 210° C. and a mold temperature of 90° C. to obtain test pieces. These were tested for tensile strength according to ASTM-D638, and for heat distortion temperature (under a load of 0.45 MPa) according to ASTM-D648. Further, the test pieces were heated at 140° C. for 10 hours, and their tensile strength was again measured. In addition their surfaces were visually checked for bleeding out. The results are given in Table 7.

TABLE 7

|  |  | Examples of the Invention | | | | | | | Comparative Examples | | | | | | |
| --- | --- | --- | --- | --- | --- | --- | --- | --- | --- | --- | --- | --- | --- | --- | --- |
|  |  | 9-1 | 9-2 | 9-3 | 9-4 | 9-5 | 9-6 | 9-7 | 9-1 | 9-2 | 9-3 | 9-4 | 9-5 | 9-6 | 9-7 |
| Polylactic Acid | wt. pt. | 80 | 80 | 80 | 80 | 80 | 80 | 80 | 100 | 100 | 100 | 100 | 100 | 100 | 100 |
| Polyacetal | wt. pt. | 20 | 20 | 20 | 20 | 20 | 20 | 20 | — | — | — | — | — | — | — |
| Plasticizer | type | A-1 | — | — | A-1 | A-2 | A-3 | A-1 | — | A-1 | — | A-1 | A-2 | A-3 | A-1 |
|  | wt. pt. | 3 | — | — | 3 | 3 | 3 | 3 | — | 3 | — | 3 | 3 | 3 | 3 |
| Nucleating Agent | type | — | B-1 | B-2 | B-1 | B-1 | B-1 | B-3 | — | — | B-1 | B-1 | B-1 | B-1 | B-3 |
|  | wt. pt. | — | 1 | 1 | 1 | 1 | 1 | 1 | — | — | 1 | 1 | 1 | 1 | 1 |
| Glass Transition Temperature | °C. | 38 | 39 | 39 | 38 | 39 | 39 | 38 | 62 | 59 | 62 | 59 | 61 | 60 | 59 |
| Crystallization Temperature at cooling | °C. | 124 | 125 | 125 | 124 | 125 | 125 | 124 | — | — | — | — | — | — | — |
| Formaldehyde Content | ppm | 40 | 100 | 100 | 150 | 200 | 150 | 100 | — | — | — | — | — | — | — |
| Tensile Strength | MPa | 53 | 59 | 61 | 53 | 55 | 55 | 54 | 65* | 54* | 65 | 55 | 54 | 55 | 56 |
| Heat Distortion Temperature | °C. | 66 | 73 | 75 | 135 | 85 | 82 | 101 | 55* | 53* | 57 | 64 | 59 | 59 | 61 |
| Bleed-out (after heat treatment) | visual observation | no | no | no | no | no | no | no | no | yes | no | yes | yes | yes | yes |
| Tensile Strength (after heat treatment) | MPa | 48 | 53 | 53 | 48 | 48 | 47 | 50 | 64* | broken while processed | 61 | broken while processed | 32 | 29 | broken while processed |

A-1: Polyethylene glycol (by Katayama Chemical, molecular weight 2000).
A-2: Polybutylene adipate (by Sanyo Chemical, molecular weight 1000).
A-3: Neopentylglycol dibenzoate (by Sanyo Chemical).
B-1: Talc (by Fuji Talc, LMS300).
B-2: Synthetic mica (by Corp Chemical, ME-100).
B-3: Barium stearate (by Katayama Chemical).
*Test pieces were molded at a mold temperature of 60° C., since they much deformed at a mold temperature of 90° C.

As is obvious from the results in Table 7, the resin compositions that comprise polylactic acid resin, polyacetal resin and crystallization promoter and their moldings have good moldability, bleed-out resistance and heat resistance.

Example 10

Examples of the Invention and Comparative Examples

Poly-L-lactic acid resin (C-1) having a D-isomer content of 1.2% and a PMMA-calibrated weight-average molecular weight of 160,000 or poly-L-lactic acid resin (C-2) having a D-isomer content of 1% and a PMMA-calibrated weight-average molecular weight of 200,000, polyacetal copolymer (Toray's AMILUS S731) (D-1) having a melt index measured at 190° C. of 27 g/10 min and having a melting point of 170° C. or polyacetal copolymer (Toray's AMILUS S761) (D-2) having a melt index measured at 190° C. of 9 g/10 min and having a melting point of 170° C., and an impact modifier mentioned below were mixed in the ratio as in Table 8, and kneaded in melt in a 30 mmφ twin-screw extruder at a cylinder temperature of 210° C. and a revolution of 150 rpm to obtain a resin composition.

The codes for the impact modifiers in Table 8 indicate the following:

E-1: Ethylene/glycidyl methacrylate copolymer (Sumitomo Chemical's BONDFAST E).
E-2: Ethylene/ethyl acrylate copolymer (Mitsui DuPont Chemical's EVAFLEX A709).
E-3: Core/shell-type elastomer (Kanegafuchi Chemical's KANEACE M-511).
E-4: Core/shell-type elastomer (Mitsubishi Rayon's METABLEN KS0205).

Using DSC (by Seiko Electronics), the glass transition temperature (Tg) of the resin composition and the crystallization temperature (Tc) of the polyacetal resin at cooling were measured driven at a heating and cooling rate of 20° C./min. The data are given in Table 8. Like in Example 9, the formaldehyde content of the resin composition containing the polylactic acid resin and the polyacetal resin was measured, and the data are also given in Table 8. In addition, the resin composition was injection-molded at a cylinder temperature of 210° C. and a mold temperature of 40° C. to obtain test pieces. Thus molded, the test pieces were visually checked for deformation. Further, the test pieces were subjected to a tensile test according to ASTM-D638 and to an Izod impact test according to ASTM-D256. In addition, the test pieces were heated at 80° C. for 1 hour, and again visually checked for deformation. The results are all given in Table 8.

TABLE 8

|  |  | Examples of the Invention | | | | | | |
| --- | --- | --- | --- | --- | --- | --- | --- | --- |
|  |  | 10-1 | 10-2 | 10-3 | 10-4 | 10-5 | 10-6 | 10-7 |
| Polylactic Acid | type | C-1 | C-1 | C-1 | C-1 | C-2 | C-2 | C-2 |
|  | wt. pt. | 80 | 80 | 80 | 80 | 50 | 31 | 31 |

TABLE 8-continued

| Polyacetal | type | D-1 | D-1 | D-1 | D-1 | D-2 | D-2 | D-2 |
|---|---|---|---|---|---|---|---|---|
| | wt. pt. | 20 | 20 | 20 | 20 | 50 | 69 | 69 |
| Impact Modifier | type | E-1 | E-2 | E-3 | E-4 | E-3 | E-3 | E-4 |
| | wt. pt. | 25 | 25 | 25 | 25 | 25 | 25 | 25 |
| Glass Transition Temperature | °C. | 39 | 39 | 41 | 41 | — | — | 62 |
| Crystallization Temperature at cooling | °C. | 125 | 125 | 130 | 125 | 133 | 135 | 135 |
| Formaldehyde Content | ppm | 150 | 200 | 100 | 150 | 50 | 100 | 100 |
| Deformation in molding | Visual observation | deformed a little | deformed a little | deformed a little | deformed a little | not deformed | not deformed | not deformed |
| Tensile Strength | Mpa | 45 | 39 | 39 | 41 | 36 | 33 | 32 |
| Impact Strength (with notch) | J/m | 78 | 88 | 420 | 730 | 350 | 168 | 195 |
| Deformation in heating | visual observation | not deformed | not deformed | not deformed | not deformed | not deformed | not deformed | not deformed |

| | | Comparative Examples | | | | | |
|---|---|---|---|---|---|---|---|
| | | 10-1 | 10-2 | 10-3 | 10-4 | 10-5 | 10-6 |
| Polylactic Acid | type | C-1 | C-1 | C-1 | — | — | — |
| | wt. pt. | 100 | 100 | 100 | — | — | — |
| Polyacetal | type | — | — | — | D-1 | D-2 | D-2 |
| | wt. pt. | — | — | — | 100 | 100 | 100 |
| Impact Modifier | type | — | E-1 | E-2 | — | — | E-3 |
| | wt. pt. | — | 25 | 25 | — | — | 25 |
| Glass Transition Temperature | °C. | 39 | 62 | 62 | — | — | — |
| Crystallization Temperature at cooling | °C. | — | — | — | 140 | 138 | 138 |
| Formaldehyde Content | ppm | — | — | — | — | — | — |
| Deformation in molding | Visual observation | not deformed | much deformed* | much deformed* | not deformed | not deformed | not deformed |
| Tensile Strength | Mpa | 65 | 47 | 41 | 62 | 60 | 30 |
| Impact Strength (with notch) | J/m | 28 | 54 | 60 | 70 | 74 | 120 |
| Deformation in heating | visual observation | much deformed | much deformed | much deformed | not deformed | not deformed | not deformed |

E-1: Ethylene/glycidyl methacrylate copolymer (Sumitomo Chemical's BONDFAST E)
E-2: Ethylene/ethyl acrylate copolymer (Mitsui DuPont Chemical's EVAFLEX A709)
E-3: Core/shell-type elastomer (Kanegafuchi Chemical's KANEACE M-511)
E-4: Core/shell-type elastomer (Mitsubishi Rayon's METABLEN KS0205)
*Much warped in the thickness direction.

As is obvious from the results in Table 8, the resin compositions that comprise polylactic acid resin, polyacetal resin and impact modifier have higher impact strength than the comparative compositions, and they did not deform in molding and in heat treatment. Their impact strength, moldability, mechanical properties and heat resistance are all good.

Example 11

Examples of the Invention and Comparative Examples

Poly-L-lactic acid resin having a D-isomer content of 1.2% and a PMMA-calibrated weight-average molecular weight of 160,000, polyacetal copolymer (Toray's AMILUS S731) having a melt index measured at 190° C. of 27 g/10 min and having a melting point of 170° C., and polymethyl methacrylate resin (Sumitomo Chemical's SUMIPEX LG35) having a melt index measured at 230° C. of 35 g/10 min were mixed in the ratio as in Table 9, and kneaded in melt in a 40 mmφ single-screw extruder at a temperature of 210° C. and a revolution of 50 rpm to obtain a resin composition.

Using DSC, the glass transition temperature (Tg) of the resin composition and the crystallization temperature (Tc) of the polyacetal resin at cooling were measured driven at a heating and cooling rate of 20° C./min. The data are given in Table 9. Like in Example 9, the formaldehyde content of the resin composition containing the polylactic acid resin and the polyacetal resin was measured, and the data are also given in Table 9.

In addition, the composition was heated at 200° C. for 2 minutes, then pressed, and thereafter cooled in water with ice to obtain a film having a thickness of 100 μm. This was visually checked for transparency. The result is given in Table 9.

On the other hand, the resin composition was injection-molded at a cylinder temperature of 210° C. and a mold temperature of 40° C. to obtain tensile test pieces. The test pieces were subjected to a tensile test according to ASTM-D638. In addition, the test pieces were heated at 140° C. for 1 hour, and visually checked for deformation. The results are all given in Table 9.

TABLE 9

|  |  | Examples of the Invention | | | | |
| --- | --- | --- | --- | --- | --- | --- |
|  |  | 11-1 | 11-2 | 11-3 | 11-4 | 11-5 |
| Polylactic Acid | wt. pt. | 80 | 70 | 60 | 40 | 15 |
| Polyacetal | wt. pt. | 10 | 10 | 20 | 30 | 70 |
| Polymethyl Methacrylate Resin | wt. pt. | 10 | 20 | 20 | 30 | 15 |
| Glass Transition Temperature | °C. | 62 | 65 | unclear | unclear | unclear |
| Crystallization Temperature at cooling | °C. | 122 | 110 | 115 | 140 | 140 |
| Film Transparency | visual observation | transparent | transparent | transparent | opaque | opaque |
| Formaldehyde Content | ppm | 100 | 100 | 100 | 50 | 50 |
| Strength | MPa | 69 | 73 | 72 | 64 | 62 |
| Modulus of Elasticity | GPa | 2.5 | 2.6 | 2.7 | 2.5 | 2.4 |
| Elongation at break | % | 4 | 4 | 4 | 4 | 10 |
| Deformation after heating | visual observation | not deformed | not deformed | not deformed | not deformed | not deformed |

|  |  | Comparative Examples | | | |
| --- | --- | --- | --- | --- | --- |
|  |  | 11-1 | 11-2 | 11-3 | 11-4 |
| Polylactic Acid | wt. pt. | 100 | 0 | 0 | 80 |
| Polyacetal | wt. pt. | 0 | 100 | 0 | 0 |
| Polymethyl Methacrylate Resin | wt. pt. | 0 | 0 | 100 | 20 |
| Glass Transition Temperature | °C. | 65 | unclear | 105 | 63 |
| Crystallization Temperature at cooling | °C. | — | 140 | — | — |
| Film Transparency | visual observation | transparent | opaque | transparent | transparent |
| Formaldehyde Content | ppm | — | — | — | — |
| Strength | MPa | 66 | 60 | 65 | 65 |
| Modulus of Elasticity | GPa | 2.4 | 2 | 2.4 | 2.4 |
| Elongation at break | % | 3 | 30 | 3 | 3 |
| Deformation after heating | visual observation | much deformed* | not deformed | much deformed* | deformed |

*Much warped in the cross direction.

As is obvious from the results in Table 9, the resin compositions that comprise polylactic acid resin, polyacetal resin and acrylic resin have better moldability, workability, mechanical properties and heat resistance than those of the individual resins alone or those of the compositions comprising any two of the resins.

Example 12

Examples of the Invention and Comparative Examples

Poly-L-lactic acid resin having a D-isomer content of 1.2% and having a weight-average molecular weight measured through PMMA-calibrated gel permeation chromatography with a solvent of hexafluoroisopropanol of 160,000, polyacetal copolymer (Toray's AMILUS S731) having a melt index measured according to ASTM-D1238 at 190° C. of 27 g/10 min and having a melting point of 170° C., and a thermoplastic polyester resin mentioned below were mixed in the ratio as in Table 10, and kneaded in melt in a 30 mmφ twin-screw extruder at a cylinder temperature of 210° C. (but 230° C. when polybutylene terephthalate was used for the thermoplastic polyester resin) and a revolution of 200 rpm to obtain a resin composition.

The codes for the thermoplastic polyester resins in Table 10 indicate the following:

F-1: Polybutylene terephthalate (Toray's TORAYCON 1401×31)

F-2: Polybutylene terephthalate-poly(tetramethylene oxide) (Toray DuPont's HYTREL 4047).

F-3: Polybutylene (terephthalate/adipate) (BASF's ECOFLEX)

F-4: Polybutylene succinate carbonate (Mitsubishi Gas Chemical's IUPEC).

F-5: Polyhydroxybutyrate (Mitsubishi Gas Chemical's BIOGREEN).

Using DSC (by Seiko Electronics), the glass transition temperature (Tg) of the resin composition and the crystallization temperature (Tc) of the polyacetal resin at cooling were measured driven at a heating and cooling rate of 20° C./min. The data are given in Table 10. Like in Example 9, the formaldehyde content of the resin composition containing the polylactic acid resin and the polyacetal resin was measured. In addition, the resin composition was injection-molded at a cylinder temperature of 220° C. and a mold temperature of 60° C. Thus molded, the test pieces were visually checked for deformation. Further, the test pieces were subjected to a tensile test according to ASTM-D638 to measure their tensile strength and tensile modulus. The test pieces were dipped in acetone for 7 days, and then their tensile strength was again measured. From the data, the tensile strength retention of the samples was obtained. Further, the test pieces were heated in a hot air oven at 140° C. for 1 hour, and then visually observed for deformation. The results are all given in Table 10.

TABLE 10

| | | Examples of the Invention | | | | | | | |
|---|---|---|---|---|---|---|---|---|---|
| | | 12-1 | 12-2 | 12-3 | 12-4 | 12-5 | 12-6 | 12-7 | 12-8 |
| Polylactic Acid Resin | wt. pt. | 80 | 80 | 80 | 80 | 80 | 80 | 80 | 80 |
| Polyacetal | wt. pt. | 20 | 20 | 20 | 20 | 20 | 20 | 20 | 20 |
| Polyester Resin | type | F-1 | F-2 | F-3 | F-4 | F-5 | F-1 | F-1 | — |
| | wt. pt. | 20 | 20 | 20 | 20 | 20 | 60 | 3 | — |
| Glass Transition Temperature | °C. | 40 | 41 | 39 | 39 | 38 | 40 | 39 | 39 |
| Crystallization Temperature at cooling | °C. | 128 | 127 | 127 | 125 | 128 | 129 | 125 | 125 |
| Formaldehyde Content | ppm | 200 | 100 | 100 | 100 | 200 | 200 | 200 | 50 |
| Deformation in molding | | not deformed | not deformed | not deformed | not deformed | not deformed | not deformed | deformed | deformed |
| Tensile Strength | MPa | 62 | 51 | 45 | 48 | 59 | 53 | 62 | 64 |
| Tensile Modulus | MPa | 2680 | 2220 | 2150 | 2220 | 2700 | 2540 | 2570 | 2550 |
| Deformation after heat treatment | | not deformed | not deformed | not deformed | not deformed | not deformed | not deformed | not deformed | not deformed |
| Tensile Strength Retention | % | 80 | 69 | 70 | 62 | 60 | 82 | 45 | 41 |

| | | Comparative Examples | | | | | |
|---|---|---|---|---|---|---|---|
| | | 12-1 | 12-2 | 12-3 | 12-4 | 12-5 | 12-6 |
| Polylactic Acid Resin | wt. pt. | 100 | 100 | 100 | 100 | 100 | 100 |
| Polyacetal | wt. pt. | — | — | — | — | — | — |
| Polyester Resin | type | — | F-1 | F-2 | F-3 | F-4 | F-5 |
| | wt. pt. | — | 20 | 20 | 20 | 20 | 20 |
| Glass Transition Temperature | °C. | 62 | 60 | 62 | 61 | 61 | 61 |
| Crystallization Temperature at cooling | °C. | — | — | — | — | — | — |
| Formaldehyde Content | ppm | — | — | — | — | — | — |
| Deformation in molding | | much deformed* | deformed | much deformed* | much deformed* | deformed | deformed |
| Tensile Strength | MPa | 65 | 62 | 51 | 45 | 49 | 59 |
| Tensile Modulus | MPa | 2400 | 2450 | 2020 | 1930 | 2020 | 2510 |
| Deformation after heat treatment | | much deformed** | deformed | deformed | deformed | deformed | deformed |
| Tensile Strength Retention | % | 25 | 35 | 25 | 33 | 25 | 28 |

F-1: Polybutylene terephthalate (Toray's TORAYCON 1401X31)
F-2: Polybutylene terephthalate-poly(tetramethylene oxide) (Toray DuPont's HYTREL 4047)
F-3: Polybutylene (terephthalate/adipate) (BASF's ECOFLEX)
F-4: Polybutylene succinate carbonate (Mitsubishi Gas Chemical's IUPEC)
F-5: Polyhydroxybutyrate (Mitsubishi Gas Chemical's BIOGREEN).
*Much warped in the thickness direction.
**Much warped in the width direction.

As is obvious from the results in Table 10, the resin compositions of the invention that comprise the three components, polylactic acid resin, polyacetal resin and thermoplastic polyester resin have higher chemical resistance than the comparative compositions, and deformed little in molding and in heat treatment, and their modulus of elasticity is high.

Specifically, their moldability, mechanical properties, heat resistance and chemical resistance are all good.

Example 13

Examples of the Invention and Comparative Examples

Poly-L-lactic acid resin having a D-isomer content of 1.2% and having a weight-average molecular weight measured through PMMA-calibrated gel permeation chromatography with a solvent of hexafluoroisopropanol of 160,000, polyacetal copolymer (Toray's AMILUS S761) having a melt index measured according to ASTM-D1238 at 190° C. of 9 g/10 min and having a melting point of 170° C., and a thermoplastic polyester resin mentioned below were mixed in the ratio as in Table 11, and kneaded in melt in a 30 mmφ twin-screw extruder at a cylinder temperature of 220° C. (but 230° C. when A-1 was used for the thermoplastic polyester resin) and a revolution of 150 rpm to obtain a resin composition.

The codes for the thermoplastic polyester resins in Table 11 indicate the following:

F-1: Polybutylene terephthalate (Toray's TORAYCON 1401X31)

F-2: Polybutylene terephthalate-poly(tetramethylene oxide) (Toray DuPont's HYTREL 4047).

Using DSC, the crystallization temperature (Tc) of the polyacetal resin in the resin composition at cooling was measured driven at a heating and cooling rate of 20° C./min. The data are given in Table 11. Like in Example 9, the formaldehyde content of the resin composition containing the polylactic acid resin and the polyacetal resin was measured.

In addition, the resin composition was injection-molded at a cylinder temperature of 220° C. and a mold temperature of 40° C. Thus molded, the test pieces were visually checked for deformation. The test pieces were subjected to a tensile test according to ASTM-D638. Further, the tensile test piece having a full length of 21 cm was set on a tool having a length of 20 cm, while curved as in FIG. 1, and this was dipped in an aqueous 20% hydrochloric acid solution, in which the time taken by it before it began to crack was measured. FIG. 1 is a conceptual view showing the test piece set on the tool. In this, the test piece 1 is curved and set on the tool 2.

Further, the test pieces were heated in a hot air oven at 140° C. for 1 hour, and then visually observed for deformation. The results are all given in Table 11.

H-2: Swelling synthetic mica (Co-op Chemical's ME-100).
E-1: Ethylene/glycidyl methacrylate copolymer (Sumitomo Chemical's BONDFAST E).

TABLE 11

|  |  | Examples of the Invention | | | | Comparative Examples | | |
| --- | --- | --- | --- | --- | --- | --- | --- | --- |
|  |  | 13-8 | 13-9 | 13-10 | 13-11 | 13-8 | 13-9 | 13-10 |
| Polylactic Acid Resin | wt. pt. | 20 | 20 | 20 | 20 | — | — | — |
| Polyacetal | wt. pt. | 80 | 80 | 80 | 80 | 100 | 100 | 100 |
| Polyester Resin | type | F-1 | F-2 | F-1 | F-1 | — | F-1 | F-2 |
|  | wt. pt. | 25 | 25 | 60 | 3 | — | 25 | 25 |
| Glass Transition Temperature | °C. | 138 | 138 | 139 | 138 | 140 | 140 | 140 |
| Formaldehyde Content | ppm | 150 | 100 | 200 | 150 | — | — | — |
| Deformation in molding |  | not deformed | not deformed | not deformed | not deformed | not deformed | not deformed | not deformed |
| Tensile Strength | MPa | 55 | 45 | 46 | 59 | 62 | 45 | 35 |
| Tensile Modulus | MPa | 2200 | 1570 | 2120 | 2150 | 1920 | 2050 | 1350 |
| Time taken before cracking | min | 90 | 140 | 100 | 70 | 60 | 30 | 50 |
| Deformation after heat treatment |  | not deformed | not deformed | not deformed | not deformed | not deformed | not deformed | not deformed |

F-1: Polybutylene terephthalate (Toray's TORAYCON 1401X31)
F-2: Polybutylene terephthalate-poly(tetramethylene oxide) (Toray DuPont's HYTREL 4047)

As is obvious from the results in Table 11, the resin compositions of the invention that comprise the three components, polylactic acid resin, polyacetal resin and thermoplastic polyester resin have higher chemical resistance and better mechanical properties than the comparative compositions.

Example 14

Examples of the Invention and Comparative Examples

Poly-L-lactic acid resin having a D-isomer content of 1.8% and having a weight-average molecular weight measured through PMMA-calibrated gel permeation chromatography with a solvent of hexafluoroisopropanol of 180,000, polyacetal copolymer (Toray's AMILUS S731) having a melt index measured according to ASTM-D1238 at 190° C. of 27 g/10 min and having a melting point of 170° C., and a polyamide resin, a phyllosilicate and an impact resistance improver mentioned below were mixed in the ratio as in Table 12, and kneaded in melt in a 30 mmφ twin-screw extruder at a cylinder temperature of 220° C. (but at 230° C. only when nylon 6 was used) and a revolution of 150 rpm to obtain a resin composition.

The codes for the polyamide resins (G-1 to G-3), the phyllosilicates (H-1 to H-2) and the impact resistance improver (E-1) in Table 12 indicate the following:
G-1: Nylon 6 (Toray's AMILAN CM1001).
G-2: Nylon 11 (Toray's RILSAN BMN).
G-3: Nylon 12 (Toray's RILSAN AMN).
H-1: 12-Aminododecanoic acid hydrochloride-exchanged montmorillonite.

H-1, 12-aminododecanoic acid hydrochloride-exchanged montmorillonite was prepared as follows: 100 g of Na-type montmorillonite (Kunimine Industry's KUNIPIA F, cation-exchange capacity 120 meq/100 g) was dispersed in 10 liters of hot water with stirring, and 2 liters of hot water with 30.2 g of 12-aminododecanoic acid hydrochloride (its amount is equivalent to the cation-exchange capacity of the montmorillonite) dissolved therein was added thereto and stirred for 1 hour. The precipitate formed was taken out through filtration, and washed three times with hot water, and the solid thus obtained was dried in vacuum at 80° C.

Using DSC (by Seiko Electronics), the glass transition temperature (Tg) of the resin composition and the crystallization temperature (Tc) of the polyacetal resin at cooling were measured driven at a heating and cooling rate of 20° C./min. Thus measured, the polylactic acid-derived glass transition temperature, and the polyacetal resin-derived crystallization temperature at cooling are given in Table 12. Like in Example 9, the formaldehyde content of the resin composition containing the polylactic acid resin and the polyacetal resin was measured.

In addition, the resin composition was injection-molded at a cylinder temperature of 220° C. and a mold temperature of 60° C. Thus molded, the test pieces were visually checked for deformation. Further, the test pieces were subjected to a flexural test according to ASTM-D790 and to an Izod impact test (un-notch) according to ASTM-D256. In addition, the test pieces were heated in a hot air oven at 140° C. for 1 hour, and again visually checked for deformation. The results are all given in Table 12.

TABLE 12

|  |  | Examples of the Invention | | | | | | | |
| --- | --- | --- | --- | --- | --- | --- | --- | --- | --- |
|  |  | 14-1 | 14-2 | 14-3 | 14-4 | 14-5 | 14-6 | 14-7 | 14-8 |
| Polylactic Acid Resin | wt. pt. | 80 | 80 | 80 | 80 | 80 | 80 | 80 | 80 |
| Polyacetal | wt. pt. | 20 | 20 | 20 | 20 | 20 | 20 | 20 | 20 |
| Polyamide Resin | type | G-1 | G-2 | G-3 | G-3 | G-3 | G-1 | G-1 | G-1 |

TABLE 12-continued

|  |  |  |  |  |  |  |  |  |  |
|---|---|---|---|---|---|---|---|---|---|
|  | wt. pt. | 25 | 25 | 25 | 60 | 3 | 25 | 25 | 25 |
| Phyliosilicate | type | — | — | — | — | — | H-1 | H-2 | H-1 |
|  | wt. pt. | — | — | — | — | — | 3 | 3 | 3 |
| Impact Resistance Improver | type | — | — | — | — | — | — | — | E-1 |
|  | wt. pt. | — | — | — | — | — | — | — | 14 |
| Glass Transition Temperature | °C. | 39 | 38 | 40 | 40 | 39 | 39 | 38 | 39 |
| Crystallization Temperature at cooling | °C. | 128 | 127 | 127 | 127 | 125 | 130 | 130 | 131 |
| Formaldehyde Content | ppm | 100 | 50 | 50 | 50 | 100 | 200 | 200 | 200 |
| Deformation in molding |  | not deformed | not deformed | not deformed | not deformed | deformed* | not deformed | not deformed | not deformed |
| Flexural Modulus | MPa | 3810 | 3520 | 3530 | 3200 | 3900 | 4470 | 4350 | 3450 |
| Impact Strength | kJ/m² | 28 | 38 | 45 | 31 | 17 | 25 | 23 | 45 |
| Deformation after heat treatment |  | not deformed | not deformed | not deformed | not deformed | not deformed | not deformed | not deformed | not deformed |

|  |  | Comparative Examples |  |  |  |  |  |  |
|---|---|---|---|---|---|---|---|---|
|  |  | 14-1 | 14-2 | 14-3 | 14-4 | 14-5 | 14-6 | 14-7 |
| Polylactic Acid Resin | wt. pt. | 100 | 100 | 100 | 100 | 100 | 100 | 100 |
| Polyacetal | wt. pt. | — | — | — | — | — | — | — |
| Polyamide Resin | type | — | G-1 | G-2 | G-3 | — | — | — |
|  | wt. pt. | — | 25 | 25 | 25 | — | — | — |
| Phyliosilicate | type | — | — | — | — | H-1 | H-2 | — |
|  | wt. pt. | — | — | — | — | 3 | 3 | — |
| Impact Resistance Improver | type | — | — | — | — | — | — | E-1 |
|  | wt. pt. | — | — | — | — | — | — | 10 |
| Glass Transition Temperature | °C. | 62 | 60 | 61 | 61 | 62 | 62 | 62 |
| Crystallization Temperature at cooling | °C. | — | — | — | — | — | — | — |
| Formaldehyde Content | ppm | — | — | — | — | — | — | — |
| Deformation in molding |  | much deformed* | deformed* | much deformed* | much deformed* | much deformed* | much deformed* | much deformed* |
| Flexural Modulus | MPa | 3800 | 3540 | 3240 | 3250 | 3950 | 3930 | 2970 |
| Impact Strength | kJ/m² | 15 | 18 | 22 | 24 | 12 | 11 | 45 |
| Deformation after heat treatment |  | much deformed* | not deformed | deformed** | deformed** | deformed** | deformed** | deformed** |

G-1: Nylon 6 (Toray's AMILAN CM1001)
G-2: Nylon 11 (Toray's RILSAN BMN)
G-3: Nylon 12 (Toray's RILSAN AMN)
H-1: 12-Aminododecanoic acid hydrochloride-exchanged montmorillonite
H-2: Swelling synthetic mica (Co-op Chemical's ME-100)
E-1: Ethylene/glycidyl methacrylate copolymer (Sumitomo Chemical's BONDFAST E)
*Warped in the thickness direction of the sample
**Warped in the width direction of the sample.

As is obvious from the results in Table 12, the resin compositions of the invention that comprise the three components, polylactic acid resin, polyacetal resin and polyamide resin have higher toughness than the comparative compositions, and they deformed little in molding and in heat treatment. Their moldability, mechanical properties, heat resistance and toughness are all good. In addition, it is understood that, when phyllosilicate was added thereto, the mechanical strength of the samples further increased, and when impact resistance improver was added thereto, the mechanical properties and the stiffness of the samples were further improved.

Example 15

Examples of the Invention and Comparative Examples

Poly-L-lactic acid resin having a D-isomer content of 1.8% and having a weight-average molecular weight measured through PMMA-calibrated gel permeation chromatography with a solvent of hexafluoroisopropanol of 180,000, polyacetal copolymer (Toray's AMILUS S761) having a melt index measured according to ASTM-D1238 at 190° C. of 9 g/10 min and having a melting point of 170° C., talc (Fuji Talc's LMS100), and a polyamide resin mentioned below were mixed in the ratio as in Table 13, and kneaded in melt in a 30 mmφ twin-screw extruder at a cylinder temperature of 210° C. (but 230° C. when nylon 6 was used) and a revolution of 150 rpm to obtain a resin composition.

The codes for the polyamide resins in Table 13 indicate the following:
G-1: Nylon 6 (Toray's AMILAN CM1001).
G-3: Nylon 12 (Toray's RILSAN AMN).

The resin composition was injection-molded at a cylinder temperature of 220° C. and a mold temperature of 60° C. Thus molded, the test pieces were visually checked for deformation. Next, the test pieces were subjected to a flexural test according to ASTM-D790; and the mean friction coefficient of each sample was measured according to JIS K-7218. Further, the test pieces were heated in a hot air oven at 140° C. for 1 hour, and then again visually checked for deformation. The results are all given in Table 13.

TABLE 13

|  |  | Examples of the Invention | | | | Comparative Examples | | |
| --- | --- | --- | --- | --- | --- | --- | --- | --- |
|  |  | 15-9 | 15-10 | 15-11 | 15-12 | 15-9 | 15-10 | 15-11 |
| Polylactic Acid Resin | wt. pt. | 10 | 10 | 10 | 10 | — | — | — |
| Polyacetal | wt. pt. | 90 | 90 | 90 | 90 | 100 | 100 | 100 |
| Polyamide Resin | type | G-1 | G-3 | G-3 | G-3 | — | G-1 | G-3 |
|  | wt. pt. | 10 | 10 | 60 | 3 | — | 10 | 10 |
| Talc | wt. pt. | 27 | 27 | 40 | 26 | 25 | 27 | 27 |
| Deformation in molding |  | not deformed | not deformed | not deformed | not deformed | not deformed | not deformed | not deformed |
| Flexural Modulus | MPa | 5120 | 5050 | 4350 | 4810 | 4550 | 4830 | 4680 |
| Friction Coefficient |  | 0.38 | 0.36 | 0.43 | 0.55 | 0.58 | 0.48 | 0.47 |
| Deformation after heat treatment |  | not deformed | not deformed | not deformed | not deformed | not deformed | not deformed | not deformed |

G-1: Nylon 6 (Toray's AMILAN CM1001)
G-3: Nylon 12 (Toray's RILSAN AMN)

As is obvious from the results in Table 13, it is understood that the resin compositions of the invention that comprise the three components, polylactic acid resin, polyacetal resin and polyamide resin have higher stiffness than the comparative compositions, and the former are better than the latter also in point of the friction characteristics.

Example 16

Examples of the Invention and Comparative Examples

Poly-L-lactic acid resin having a D-isomer content of 2% and a PMMA-calibrated weight-average molecular weight of 170,000, polyacetal copolymer (Toray's AMILUS S731) having a melt index measured at 190° C. of 27 g/10 min and having a melting point of 170° C., and a reinforcement shown in Table 14 were mixed in the ratio as in Table 14, and kneaded in melt in a 30 mmφ twin-screw extruder at a temperature of 210° C. and a revolution of 150 rpm to obtain a resin composition.

The codes for the reinforcements in Table 14 indicate the following:
I-1: Glass fibers (by Nittobo, 3J948).
I-2: Wollastonite (by Partek, WICKROLL).
I-3: Aluminium borate whiskers (by Shikoku Kasei, ARBOLEX)
I-4: Potassium titanate whiskers (by Otsuka Chemical, TISMO)
I-5: Mica (by Yamaguchi Mica Industry, 21PU).

Using DSC (by Seiko Electronics), the glass transition temperature (Tg) of the resin composition and the crystallization temperature (Tc) of the polyacetal resin at cooling were measured driven at a heating and cooling rate of 20° C./min. The data are given in Table 14. Like in Example 9, the formaldehyde content of the resin composition containing the polylactic acid resin and the polyacetal resin was measured.

In addition, the resin composition was injection-molded at a cylinder temperature of 210° C. and a mold temperature of 90° C. (partly 40° C.) to obtain tensile test pieces. Thus molded, the tensile test pieces were visually checked for deformation.

Further, the tensile test pieces were subjected to a tensile test according to ASTM-D638 and to an Izod impact test according to ASTM-D256. In addition, they were tested for heat distortion temperature according to ASTM-D648 (under a load of 1.82 MPa). Further, they were heated at 140° C. for 1 hour, and again visually checked for deformation. The results are all given in Table 14.

TABLE 14

|  |  | Examples of the Invention | | | | | | | |
| --- | --- | --- | --- | --- | --- | --- | --- | --- | --- |
|  |  | 16-1 | 16-2 | 16-3 | 16-4 | 16-5 | 16-6 | 16-7 | 16-8 |
| Polylactic Acid | wt. pt. | 80 | 80 | 80 | 80 | 80 | 75 | 50 | 25 |
| Polyacetal | wt. pt. | 20 | 20 | 20 | 20 | 20 | 25 | 50 | 75 |
| Reinforcement | type | I-1 | I-1 | I-2 | I-3 | I-4 | I-5 | I-1 | I-1 |
|  | wt. pt. | 17.6 | 17.6 | 17.6 | 17.6 | 17.6 | 25 | 17.6 | 17.6 |
| Glass Transition Temperature | ° C. | 39 | 39 | 39 | 39 | 39 | 34 | — | — |
| Crystallization Temperature at cooling | ° C. | 125 | 125 | 125 | 125 | 125 | 127 | 133 | 138 |
| Formaldehyde Content | ppm | 150 | 200 | 200 | 200 | 100 | 200 | 50 | 100 |
| Mold Temperature | ° C. | 90 | 40 | 90 | 90 | 90 | 90 | 40 | 40 |
| Deformation in molding | visual observation | not deformed | not deformed | not deformed | not deformed | not deformed | not deformed | not deformed | not deformed |
| Tensile Strength | MPa | 93 | 95 | 56 | 68 | 65 | 63 | 92 | 90 |
| Impact Strength (with notch) | J/m | 67 | 68 | 25 | 32 | 31 | 33 | 65 | 65 |
| Heat Distortion Temperature | ° C. | 156 | 63 | 83 | 86 | 86 | 70 | 159 | 160 |
| Deformation in heating | visual observation | not deformed | not deformed | not deformed | not deformed | not deformed | not deformed | not deformed | not deformed |

TABLE 14-continued

|  |  | Comparative Examples | | | | | | | | |
|---|---|---|---|---|---|---|---|---|---|---|
|  |  | 16-1 | 16-2 | 16-3 | 16-4 | 16-5 | 16-6 | 16-7 | 16-8 | 16-9 |
| Polylactic Acid | wt. pt. | 100 | 100 | 100 | 100 | 100 | 100 | 100 | 100 | — |
| Polyacetal | wt. pt. | — | — | — | — | — | — | — | — | 100 |
| Reinforcement | type | — | — | I-1 | I-1 | I-2 | I-3 | I-4 | I-5 | I-1 |
|  | wt. pt. | — | — | 17.6 | 17.6 | 17.6 | 17.6 | 17.6 | 25 | 17.6 |
| Glass Transition Temperature | ° C. | 62 | 62 | 62 | 62 | 62 | 62 | 62 | 62 | — |
| Crystallization Temperature at cooling | ° C. | — | — | — | — | — | — | — | — | 140 |
| Formaldehyde Content | ppm | — | — | — | — | — | — | — | — | 140 |
| Mold Temperature | ° C. | 90 | 40 | 90 | 40 | 90 | 90 | 90 | 90 | 40 |
| Deformation in molding | visual observation | much curled | not deformed | deformed at pushing rod parts | not deformed | Deformed at pushing rod parts | Deformed at pushing rod parts | Deformed at pushing rod parts | Deformed at pushing rod parts | not deformed |
| Tensile Strength | MPa | —* | 65 | 90 | 88 | 55 | 67 | 64 | 64 | 75 |
| Impact Strength (with notch) | J/m | —* | 30 | 65 | 60 | 27 | 33 | 30 | 30 | 45 |
| Heat Distortion Temperature | ° C. | —* | 54 | 73 | 56 | 65 | 65 | 64 | 56 | 155 |
| Deformation in heating | visual observation | — | twisted | warped | much warped | warped | warped | warped | warped | not deformed |

I-1: Glass fibers (by Nittobo, 3J948)
I-2: Wollastonite (by Partek, WICKROLL 110)
I-3: Aluminium borate whiskers (by Shikoku Kasei, ARBOLEX)
I-4: Potassium titanate whiskers (by Otsuka Chemical, TISMO)
I-5: Mica (by Yamaguchi Mica Industry, 21PU)
*Too much deformed, the test piece could not be tried for measurement.

From the results in Table 14, it is understood that the resin compositions that comprises polylactic acid resin, polyacetal resin and reinforcement have better heat resistance and mechanical properties.

Example 17

Examples of the Invention and Comparative Examples

Poly-L-lactic acid resin having a D-isomer content of 2% and a PMMA-calibrated weight-average molecular weight of 170,000, polyacetal copolymer (Toray's AMILUS S731) having a melt index measured at 190° C. of 27 g/10 min and having a melting point of 170° C., and a stabilizer shown in Table 15 were mixed in the ratio as in Table 15, and kneaded in melt in a 30 mmϕ twin-screw extruder at a temperature of 210° C. and a revolution of 150 rpm to obtain a resin composition.

The codes for the stabilizers in Table 15 indicate the following:
J-1: Triethylene glycol-bis[3-(3-t-butyl-5-methyl-4-hydroxyphenyl)propionate] (Ciba-Geigy's IRGANOX 245).
J-2: Tetrakis(2,4-di-t-butylphenyl)-4,4'-biphenylene phosphonite (Sandoz's SANDOSTAB P-EPQ).
J-3: Pentaerythritol tetrakis(3-laurylthiopropionate) (Asahi Denka's AO-412S).
J-4: Melamine (by Tokyo Kasei Kogyo).
J-5: Benzoguanamine (by Tokyo Kasei Kogyo).

Using DSC (by Seiko Electronics) driven at a heating and cooling rate of 20° C./min, the glass transition temperature (Tg) of the resin composition and the crystallization temperature (Tc) of the polyacetal resin in the composition at cooling were measured. The crystallization temperature of polyacetal alone at cooling was 140° C. Like in Example 9, the formaldehyde content of the resin composition containing the polylactic acid resin and the polyacetal resin was measured.

In addition, the resin composition was injection-molded at a cylinder temperature of 210° C. and a mold temperature of 60° C. to obtain tensile test pieces. Thus molded, the tensile test pieces were visually checked for deformation.

Further, the tensile test pieces were subjected to a tensile test according to ASTM-D638. In addition, they were heated in a hot air oven at 120° C. for 200 hours, and then again subjected to the tensile test to obtain the strength retention thereof. The results are all given in Table 15.

TABLE 15

|  |  | Examples of the Invention | | | | | Comparative Examples | | | |
|---|---|---|---|---|---|---|---|---|---|---|
|  |  | 17-1 | 17-2 | 17-3 | 17-4 | 17-5 | 17-1 | 17-2 | 17-3 | 17-4 |
| Polylactic Acid | wt. pt. | 80 | 80 | 80 | 80 | 80 | 100 | 100 | 100 | 100 |
| Polyacetal | wt. pt. | 20 | 20 | 20 | 20 | 20 | — | — | — | — |
| Stabilizer 1 | type | J-1 | J-2 | J-3 | J-1 | J-2 | — | J-1 | J-2 | J-3 |
|  | wt. pt. | 0.3 | 0.3 | 0.3 | 0.3 | 0.3 | — | 0.3 | 0.3 | 0.3 |
| Stabilizer 2 | type | — | — | — | J-4 | J-5 | — | — | — | — |
|  | wt. pt. | — | — | — | 0.1 | 0.1 | — | — | — | — |
| Glass Transition Temperature | ° C. | 39 | 39 | 39 | 39 | 39 | 62 | 62 | 62 | 62 |

TABLE 15-continued

|  |  | Examples of the Invention |  |  |  |  | Comparative Examples |  |  |  |
|---|---|---|---|---|---|---|---|---|---|---|
|  |  | 17-1 | 17-2 | 17-3 | 17-4 | 17-5 | 17-1 | 17-2 | 17-3 | 17-4 |
| Crystallization Temperature at cooling | °C. | 125 | 125 | 125 | 125 | 125 | — | — | — | — |
| Formaldehyde Content | ppm | 50 | 50 | 50 | 10 | 20 | — | — | — | — |
| Deformation of Test Pieces |  | not deformed | not deformed | not deformed | not deformed | not deformed | much deformed* | much deformed* | much deformed* | much deformed* |
| Tensile Strength | MPa | 64 | 63 | 65 | 63 | 62 | 68 | 65 | 64 | 65 |
| Tensile Modulus | MPa | 2610 | 2620 | 2590 | 2580 | 2650 | 2380 | 2450 | 2430 | 2430 |
| Tensile Strength Retention | % | 51 | 48 | 35 | 60 | 55 | 10 | 23 | 19 | 16 |

J-1: Triethylene glycol bis[3-(3-t-butyl-5-methyl-4-hydroxyphenyl)propionate]
J-2: Tetrakis(2,4-di-t-butylphenyl)-4,4'-biphenylene phosphonite
J-3: Pentaerythritol tetrakis(3-laurylthiopropionate)
J-4: Melamine
J-5: Benzoguanamine
*Much warped in the thickness direction.

From the results in Table 15, it is understood that the resin compositions that comprises polylactic acid resin, polyacetal resin and stabilizer have better long-term heat resistance and have better moldability and mechanical properties than polylactic acid resin alone and polylactic acid combined with stabilizer alone.

Example 18

Examples of the Invention and Comparative Examples

Poly-L-lactic acid resin having a D-isomer content of 2% and a PMMA-calibrated weight-average molecular weight of 170,000, polyacetal copolymer (Toray's AMILUS S761) having a melt index measured at 190° C. of 9 g/10 min and having a melting point of 170° C., and a stabilizer shown in Table 16 were mixed in the ratio as in Table 16, and kneaded in melt in a 30 mmφ twin-screw extruder at a temperature of 200° C. and a revolution of 150 rpm to obtain a resin composition.

The codes for the stabilizers in Table 16 indicate the following:
J-6:
2-(2'-Hydroxy-3',5'-di-tert-butylphenyl)benzotriazole (Ciba-Geigy's TINUVIN 320).
J-7: Bis(2,2,6,6-tetramethyl-4-piperidyl) sebacate (Ciba-Geigy's TINUVIN 770).

Using DSC (by Seiko Electronics) driven at a heating and cooling rate of 20° C./min, the crystallization temperature (Tc) of the polyacetal resin in the resin composition at cooling was measured. The crystallization temperature of polyacetal alone at cooling was 139° C. Like in Example 9, the formaldehyde content of the resin composition containing the polylactic acid resin and the polyacetal resin was measured.

In addition, the resin composition was injection-molded at a cylinder temperature of 200° C. and a mold temperature of 80° C. to obtain tensile test pieces. Thus molded, the tensile test pieces were subjected to a tensile test according to ASTM-D638. In addition, they were subjected to a weathering test by exposing them to a xenon weather meter for fading at 83° C. for 1000 hours. Thus faded, the tensile elongation of the test pieces was again measured, and the elongation retention thereof was obtained. In addition, the surface condition of each test pieces (presence or absence of cracks, color change) was observed with an optical microscope, and evaluated in three ranks. (The larger number indicates better surface condition. 3: Few cracks were found, and color change was small. 2: Some cracks were found, and the surface was yellowed. 1: Many cracks were found, and the surface was much yellowed.) The results are all given in Table 16.

TABLE 16

|  |  | Examples of the Invention |  | Comparative Examples |  |  |
|---|---|---|---|---|---|---|
|  |  | 18-6 | 18-7 | 18-6 | 18-7 | 18-8 |
| Polylactic Acid | wt. pt. | 20 | 20 | — | — | — |
| Polyacetal | wt. pt. | 80 | 80 | 100 | 100 | 100 |
| Stabilizer | type | J-6 | J-7 | — | J-6 | J-7 |
|  | wt. pt. | 0.3 | 0.3 | — | 0.3 | 0.3 |
| Crystallization Temperature at cooling | °C. | 137 | 137 | 139 | 137 | 137 |
| Formaldehyde Content | ppm | 100 | 100 | — | — | — |
| Deformation of Test Pieces |  | not deformed | not deformed | not deformed | not deformed | not deformed |
| Tensile Strength | MPa | 60 | 59 | 62 | 62 | 62 |
| Tensile Modulus | MPa | 2250 | 2210 | 1920 | 1990 | 1980 |
| Tensile Elongation | MPa | 45 | 38 | 49 | 45 | 42 |

TABLE 16-continued

|  |  | Examples of the Invention | | Comparative Examples | | |
| --- | --- | --- | --- | --- | --- | --- |
|  |  | 18-6 | 18-7 | 18-6 | 18-7 | 18-8 |
| Tensile Elongation Retention | % | 70 | 65 | 10 | 47 | 45 |
| Surface Condition |  | 3 | 3 | 1 | 2 | 2 |

J-6: 2-(2'-Hydroxy-3',5'-di-tert-butyl-phenyl)benzotriazole
J-7: Bis(2,2,6,6-tetramethyl-4-piperidyl) sebacate From the results in Table 16, is understood that the resin compositions of the invention have better weathering and mechanical properties than conventional polyacetal resin.

Example 19

Examples of the Invention and Comparative Examples

Poly-L-lactic acid resin having a D-isomer content of 2% and having a weight-average molecular weight measured through PMMA-calibrated gel permeation chromatography with a solvent of hexafluoroisopropanol of 170,000, polyacetal copolymer (Toray's AMILUS S731) having a melt index measured according to ASTM-D1238 at 190° C. of 27 g/10 min and having a melting point of 170° C., and a mold release agent mentioned in Table 17 were mixed in the ratio as in Table 17, and kneaded in melt in a 30 mmφ twin-screw extruder at a temperature of 210° C. and a revolution of 150 rpm to obtain a resin composition.

The codes for the mold release agents in Table 17 indicate the following:
K-1: Montanate (Clariant's LICOWAX E).
K-2: Partially-saponified montanate (Clariant's LICOWAX OP)
K-3: Oxidized polyethylene wax (Mitsui Chemical's HIWAX 320P).
K-4: Erucamide (Nippon Yushi's ALFLOW P10).
K-5: Ethylenebisstearamide (Nippon Yushi's ALFLOW H-50T).

Using DSC (by Seiko Electronics) driven at a heating and cooling rate of 20° C./min, the glass transition temperature (Tg) of the resin composition and the crystallization temperature (Tc) of the polyacetal resin in the composition at cooling were measured. The crystallization temperature of the polyacetal alone at cooling was 140° C. Like in Example 9, the formaldehyde content of the resin composition containing the polylactic acid resin and the polyacetal resin was measured.

In addition, the resin composition was injection-molded at a cylinder temperature of 210° C. and a mold temperature of 60° C. to give ASTM #1 tensile test pieces. Each sample was tried continuously to determine how many times it could be continuously molded with neither the molding nor the sprue remaining in the mold, and based on it, the moldability of the sample was evaluated.

Further, the tensile test pieces were subjected to a tensile test according to ASTM-D638. Further, their pencil hardness was measured according to JIS K5401 using the tensile test pieces. In addition, the tensile test pieces were heated in a hot air oven at 140° C. for 1 hour and then visually checked for deformation. The results are all given in Table 17.

TABLE 17

|  |  | Examples of the Invention | | | | | | | |
| --- | --- | --- | --- | --- | --- | --- | --- | --- | --- |
|  |  | 19-1 | 19-2 | 19-3 | 19-4 | 19-5 | 19-6 | 19-7 | 19-8 |
| Polylactic Acid Resin | wt. pt. | 80 | 80 | 80 | 80 | 80 | 80 | 80 | 55 |
| Polyacetal | wt. pt. | 20 | 20 | 20 | 20 | 20 | 20 | 20 | 45 |
| Mold Release Agent | type | K-1 | K-2 | K-3 | K-4 | K-5 | K-2 | K-2 | K-2 |
|  | wt. pt. | 0.2 | 0.2 | 0.2 | 0.2 | 0.2 | 0.02 | 2 | 0.2 |
| Glass Transition Temperature | ° C. | 39 | 39 | 39 | 39 | 39 | 39 | 38 | unclear |
| Crystallization Temperature at cooling | ° C. | 125 | 125 | 125 | 125 | 125 | 125 | 127 | 133 |
| Formaldehyde Content | Ppm | 50 | 50 | 100 | 50 | 50 | 50 | 150 | 50 |
| Number of Continuous Molding Operations |  | >100 | >100 | 88 | 70 | >100 | 45 | 70 | 85 |
| Tensile Modulus | MPa | 2610 | 2620 | 2630 | 2620 | 2650 | 2580 | 2480 | 2450 |
| Surface Hardness |  | H | H | H | H | H | B | H | H |
| Deformation after heat treatment |  | not deformed | not deformed | not deformed | not deformed | not deformed | not deformed | not deformed | not deformed |

|  |  | Comparative Examples | | | | | |
| --- | --- | --- | --- | --- | --- | --- | --- |
|  |  | 19-1 | 19-2 | 19-3 | 19-4 | 19-5 | 19-6 |
| Polylactic Acid Resin | wt. pt. | 100 | 100 | 100 | 100 | 100 | 100 |
| Polyacetal | wt. pt. | — | — | — | — | — | — |
| Mold Release Agent | type | — | K-1 | K-2 | K-3 | K-4 | K-5 |
|  | wt. pt. | — | 0.2 | 0.2 | 0.2 | 0.2 | 0.2 |

TABLE 17-continued

| | | | | | | | |
|---|---|---|---|---|---|---|---|
| Glass Transition Temperature | °C. | 62 | 62 | 62 | 62 | 62 | 62 |
| Crystallization Temperature at cooling | °C. | — | — | — | — | — | — |
| Formaldehyde Content | Ppm | — | — | — | — | — | — |
| Number of Continuous Molding Operations | | 1 | 4 | 4 | 3 | 3 | 3 |
| Tensile Modulus | MPa | 2380 | 2410 | 2400 | 2430 | 2400 | 2410 |
| Surface Hardness | | 2B | 2B | 2B | 2B | 2B | 2B |
| Deformation after heat treatment | | much deformed* | much deformed* | much deformed* | much deformed* | much deformed* | much deformed* |

K-1: Montanate (Clariant's LICOWAX E)
K-2: Partially-saponified montanate (Clariant's LICOWAX OP)
K-3: Oxidized polyethylene wax (Mitsui Chemical's HIWAX 320P)
K-4: Erucamide (Nippon Yushi's ALFLOW P10)
K-5: Ethylenebisstearamide (Nippon Yushi's ALFLOW H-50T)
*Warped in the width direction of the test piece.

From the results in Table 17, it is understood that the resin compositions of the invention that comprise polylactic acid resin, polyacetal resin and mold release agent have better moldability, higher hardness and better mechanical properties and heat resistance than the polylactic acid resin alone and the polylactic acid resin combined with mold release agent alone.

Example 20

Examples of the Invention and Comparative Examples

Poly-L-lactic acid resin having a D-isomer content of 1.2% and having a weight-average molecular weight measured through PMMA-calibrated gel permeation chromatography with a solvent of hexafluoroisopropanol of 160,000, polyacetal copolymer (Toray's AMILUS S731) having a melt index measured according to ASTM-D1238 at 190° C. of 27 g/10 min and having a melting point of 170° C., and a carboxyl group-reactive end-capping agent and a reaction catalyst shown in Table 18 were mixed in the ratio as in Table 18, and kneaded in melt in a 30 mmφ twin-screw extruder at a cylinder temperature of 210° C. and a revolution of 150 rpm to obtain a resin composition.

The codes for the carboxyl group-reactive end-capping agent in Table 18 indicate the following:

L-1: Glycidyl ether compound (Japan Epoxy Resin's EPIKOTE 819).
L-2: Glycidyl versatate (Japan Epoxy Resin's CARDULA E).
L-3: Bis(2,6-diisopropylphenyl)carbodiimide (Raschig's STABILIZER 7000).
L-4: 2,2'-M-phenylenebis (2-oxazoline) (by Takeda Chemical).
M-1: Sodium stearate (by Katayama Chemical).
M-2: Triphenylphosphine (by Katayama Chemical).

Using DSC (by Seiko Electronics) driven at a heating and cooling rate of 20° C./min, the glass transition temperature (Tg) of the resin composition and the crystallization temperature (Tc) of the polyacetal resin in the composition at cooling were measured. The data are given in Table 18. Tc of the polyacetal resin alone was 140° C.

The resin composition was injection-molded at a cylinder temperature of 210° C. and a mold temperature of 60° C. Thus molded, the test pieces were visually checked for deformation. Further, the test pieces were subjected to a tensile test according to ASTM-D638 to measure their tensile strength. The test pieces were heated in wet at a temperature of 60° C. and a humidity of 95% for 200 hours, and then again visually checked for deformation and their tensile strength was measured. From the data, the tensile strength retention of each sample was derived. The results are all given in Table 18.

TABLE 18

| | | Examples of the Invention | | | | | | |
|---|---|---|---|---|---|---|---|---|
| | | 20-1 | 20-2 | 20-3 | 20-4 | 20-5 | 20-6 | 20-7 |
| Polylactic Acid Resin | wt. pt. | 80 | 80 | 80 | 80 | 80 | 80 | 20 |
| Polyacetal | wt. pt. | 20 | 20 | 20 | 20 | 20 | 20 | 80 |
| End-capping Agent | type | L-1 | L-2 | L-3 | L-4 | L-1 | L-1 | L-2 |
| | wt. pt. | 0.8 | 0.5 | 0.5 | 0.5 | 0.8 | 0.8 | 0.5 |
| Reaction Catalyst | type | — | — | — | — | B-1 | B-2 | — |
| | wt. pt. | — | — | — | — | 0.05 | 0.05 | — |
| Glass Transition Temperature | °C. | 39 | 39 | 39 | 39 | 39 | 39 | — |
| Crystallization Temperature at cooling | °C. | 125 | 125 | 125 | 125 | 125 | 125 | 139 |
| Deformation in molding | | not deformed | not deformed | not deformed | not deformed | not deformed | not deformed | not deformed |
| Tensile Modulus | MPa | 2670 | 2650 | 2630 | 2650 | 2690 | 2630 | 2270 |
| Deformation after wet heat treatment | | not deformed | not deformed | not deformed | not deformed | not deformed | not deformed | not deformed |
| Tensile Strength Retention | % | 55 | 62 | 60 | 58 | 64 | 61 | 89 |

TABLE 18-continued

|  |  | Comparative Examples | | | | | |
| --- | --- | --- | --- | --- | --- | --- | --- |
|  |  | 20-1 | 20-2 | 20-3 | 20-4 | 20-5 | 20-6 |
| Polylactic Acid Resin | wt. pt. | 100 | 100 | 100 | 100 | 100 | — |
| Polyacetal | wt. pt. | — | — | — | — | — | 100 |
| End-capping Agent | type | — | L-1 | L-2 | L-3 | L-4 | — |
|  | wt. pt. | — | 0.8 | 0.5 | 0.5 | 0.5 | — |
| Reaction Catalyst | type | — | — | — | — | — | — |
|  | wt. pt. | — | — | — | — | — | — |
| Glass Transition Temperature | °C. | 62 | 62 | 62 | 62 | 62 | — |
| Crystallization Temperature at cooling | °C. | — | — | — | — | — | 140 |
| Deformation in molding |  | much deformed* | much deformed* | much deformed* | much deformed* | much deformed* | not deformed |
| Tensile Modulus | MPa | 2400 | 2370 | 2380 | 2380 | 2360 | 1950 |
| Deformation after wet heat treatment |  | deformed** | deformed** | deformed** | deformed** | deformed** | not deformed |
| Tensile Strength Retention | % | 15 | 35 | 41 | 41 | 36 | 91 |

L-1: Bisphenol A Glycidyl ether (Japan Epoxy Resin's EPIKOTE 819)
L-2: Glycidyl versatate (Japan Epoxy Resin's CARDULA E)
L-3: Bis(2,6-diisopropylphenyl)carbodiimide (Raschig's STABILIZER 7000)
L-4: 2,2'-M-phenylenebis(2-oxazoline) (by Takeda Chemical)
M-1: Sodium stearate (by Katayama Chemical)
M-2: Triphenylphosphine (by Katayama Chemical)
*Much warped in the thickness direction of the test piece.
**Warped in the width direction of the test piece.

As is obvious from the results in Table 18, the resin compositions of the invention that comprise a kneaded melt of polylactic acid resin, polyacetal resin and carboxyl group-reactive end-capping agent have higher hydrolysis resistance than the comparative compositions that comprise a kneaded melt of polylactic acid resin and carboxyl group-reactive end-capping agent alone or comprise a kneaded melt of polylactic acid resin or polyacetal resin alone, and, in addition, the former deformed little in molding and in wet heat treatment, and their moldability, mechanical properties, heat resistance and hydrolysis resistance are all good.

Example 21

Examples of the Invention and Comparative Examples

Poly-L-lactic acid resin having a D-isomer content of 2% and having a weight-average molecular weight as in Table 19 measured through PMMA-calibrated gel permeation chromatography (GPC) with a solvent of hexafluoroisopropanol, poly-D-lactic acid resin having an L-isomer content of 1.5% and having a PMMA-calibrated weight-average molecular weight as in Table 19, polyacetal copolymer (Toray's AMILUS S731) having a melt index measured according to ASTM-D1238 at 190° C. of 27 g/10 min and having a melting point of 170° C., and a nucleating agent, talc (Fuji Talc's LMS300) were mixed in the ratio as in Table 19, and kneaded in melt in a 20 mmφ single-screw extruder at a temperature of 220° C. and a revolution of 50 rpm to obtain a resin composition.

Using DSC (by Perkin Elmer), the glass transition temperature and the melting temperature of the resin composition, the crystallization temperature of the polyacetal resin at cooling and the crystallization starting temperature at cooling were measured driven at a heating and cooling rate of 20° C./min. The crystallization temperature of the polyacetal alone at cooling was 140° C. In this Example, the depression in the glass transition temperature of the composition and the depression in the crystallization temperature of polyacetal resin at cooling mean the compatibility of the constitutive components; and the increase in the crystallization starting temperature at cooling means the increase in the crystallization rate.

The resin composition was pressed at 230° C. to form a sheet having a thickness of 2 mm. From this, a strip piece having a width of 1 cm and a length of 10 cm was cut out, and this was heated in a hot air oven at 160° C. for 30 minutes whereupon it was visually checked for deformation. The results are all given in Table 19.

TABLE 19

|  |  | Examples of the Invention | | | | | |
| --- | --- | --- | --- | --- | --- | --- | --- |
|  |  | 21-1 | 21-2 | 21-3 | 21-4 | 21-5 | 21-6 |
| Poly-L-lactic Acid | molecular weight | 200,000 | 130,000 | 50,000 | 200,000 | 200,000 | 200,000 |
|  | wt. pt. | 40 | 40 | 40 | 39 | 60 | 15 |
| Poly-D-lactic Acid | molecular weight | 50,000 | 130,000 | 200,000 | 50,000 | 50,000 | 50,000 |
|  | wt. pt. | 40 | 40 | 40 | 39 | 20 | 15 |
| Polyacetal | wt. pt. | 20 | 20 | 20 | 20 | 20 | 70 |
| Nucleating Agent | wt. pt. | — | — | — | 2 | — | — |
| Glass Transition Temperature | °C. | 45 | 46 | 45 | 48 | 45 | unclear |
| Melting Temperature | °C. | 161, 234 | 162, 225 | 162, 233 | 164, 231 | 162, 220* | 169, 225 |

TABLE 19-continued

| | | | | | | | |
|---|---|---|---|---|---|---|---|
| Crystallization Starting Temperature at cooling | ° C. | 162 | 155 | 164 | 170 | 155 | 154 |
| Crystallization Temperature at cooling | ° C. | 127 | 125 | 127 | 133 | 125 | 139 |
| Deformation after heat treatment | | not deformed | not deformed | not deformed | not deformed | not deformed | not deformed |

| | | Comparative Examples | | | |
|---|---|---|---|---|---|
| | | 21-1 | 21-2 | 21-3 | 21-4 |
| Poly-L-lactic Acid | molecular weight | 130,000 | 130,000 | 130,000 | — |
| | wt. pt. | 100 | 50 | 98 | — |
| Poly-D-lactic Acid | molecular weight | — | 130,000 | — | — |
| | wt. pt. | — | 50 | — | — |
| Polyacetal | wt. pt. | — | — | — | 100 |
| Nucleating Agent | wt. pt. | — | — | 2 | — |
| Glass Transition Temperature | ° C. | 62 | 62 | 63 | unclear |
| Melting Temperature | ° C. | 171 | 168, 225* | 171 | 170 |
| Crystallization Starting Temperature at cooling | ° C. | not detected | not detected | 110 | 145 |
| Crystallization Temperature at cooling | ° C. | not detected | not detected | 95 | 140 |
| Deformation after heat treatment | | much deformed | much deformed | much deformed | deformed |

*The melting peak is low.

The depression of the glass transition temperature and the crystallization temperature at cooling of polyacetal in the compositions of the invention of this Example confirms the miscibility of polylactic acid resin and polyacetal resin. As compared with that of comparative examples, the crystallization starting temperature of the samples of the invention is high, and this confirms that good crystallization characteristics of the samples of the invention. In addition, it is further understood that the samples of the invention do not deform while heat treatment and have good heat resistance.

As in Table 19, when both poly-L-lactic acid resin and poly-D-lactic acid resin are used for forming a stereo-complex, the resulting stereo-complex has an increased melting temperature of not lower than 220° C. Of those having two melting temperatures, the samples 21-1 to 21-4 and 21-6 of the invention are described. The lower point of the two melting temperatures of these is the melting temperature of polyacetal resin, and the higher point thereof is the melting temperature of polylactic acid resin. Since the polylactic acid resin forms a stereo-complex and is combined with polyacetal resin, it is believed that the crystallization rate and the heat resistance of the resin composition are much increased. The higher melting point of the sample 21-5 of the invention is the melting temperature of polylactic acid resin, but its melting peak is low. This means that the amount of the stereo-complex formed is small, but the composition contains polyacetal resin and has therefore good properties.

From these results, it is understood that the resin compositions of the invention have good crystallization properties and good heat resistance.

Example 22

Examples of the Invention and Comparative Examples

Poly-L-lactic acid resin having a D-isomer content of 1.2% and having a weight-average molecular weight measured through PMMA-calibrated gel permeation chromatography with a solvent of hexafluoroisopropanol of 160,000, polyacetal copolymer (Toray's AMILUS S731) having a melt index measured according to ASTM-D1238 at 190° C. of 27 g/10 min and having a melting point of 170° C., and various crystalline thermoplastic resins mentioned below were mixed in the ratio as in Table 20, and kneaded in melt in a 30 mmϕ twin-screw extruder at a cylinder temperature of 220° C. and a revolution of 150 rpm to obtain a resin composition.

The codes for the thermoplastic resins in Table 20 indicate the following:

A-1: Polypropylene (Sumitomo Chemical's NOBLEN Y101).

A-2: High-density polyethylene (Mitsui Chemical's, HI-ZEX 2200J).

A-3: Aliphatic polyketone (Shell's CARILON P1000).

Using a differential scanning calorimeter (DSC, by Seiko Electronics) driven at a heating and cooling rate of 20° C./min, the polylactic acid resin-derived glass transition temperature (Tg) of the resin composition and the polyacetal resin-derived crystallization temperature (Tc) at cooling thereof were measured. The data are given in Table 20.

The resin composition was injection-molded at a cylinder temperature of 210° C. and a mold temperature of 60° C. Thus molded, the test pieces were visually checked for deformation and surface appearance. Further, the test pieces were subjected to a flexural test according to ASTM-D790. The test pieces were heated in a hot air oven at 140° C. for 1 hour, and then visually checked for deformation. The results are all given in Table 20. For deformation, the test pieces were evaluated in four ranks. (OO means no deformation; O means some deformation, which, however, could not be confirmed in visual observation; Δ means deformation that is visually seen; and X means serious deformation.) The outward appearance of each sample was evaluated in four ranks as follows:

◎: Seemingly not transparent, but glossy and high-quality.

○: Seemingly not transparent, but pearly glossy.

Δ: Seemingly transparent in some degree on the surface.

X: Obviously or seemingly transparent and poor-quality.

TABLE 20

|  |  | Examples of the Invention | | | | | Comparative Samples | | | | | |
| --- | --- | --- | --- | --- | --- | --- | --- | --- | --- | --- | --- | --- |
|  |  | 22-1 | 22-2 | 22-3 | 22-4 | 22-5 | 22-1 | 22-2 | 22-3 | 22-4 | 22-5 | 22-6 |
| Polylactic Acid Resin | wt. pt. | 80 | 80 | 80 | 80 | 20 | 100 | 100 | 100 | 100 | — | — |
| Polyacetal | wt. pt. | 20 | 20 | 20 | 20 | 80 | — | — | — | — | 100 | 100 |
| Thermoplastic Resin | type | A-1 | A-2 | A-3 | A-1 | A-1 | — | A-1 | A-2 | A-3 | — | A-1 |
|  | wt. pt. | 10 | 10 | 10 | 60 | 10 | — | 10 | 10 | 10 | — | 10 |
| Glass Transition Temperature | ° C. | 39 | 39 | 41 | 41 | — | 62 | 62 | 62 | 63 | — | — |
| Crystallization Temperature at cooling | ° C. | 127 | 127 | 127 | 129 | 137 | — | — | — | — | 140 | 140 |
| Deformation in molding |  | ◎ | ◎ | ◎ | ○ | ◎ | X | X | X | X | ◎ | ○ |
| Surface Appearance |  | ◎ | ◎ | ◎ | ○ | ◎ | X | X | Δ | X | ○ | ○ |
| Tensile Modulus | MPa | 3850 | 3780 | 3800 | 2970 | 3250 | 3750 | 3560 | 3400 | 3550 | 2480 | 2390 |
| Deformation after heat treatment |  | ◎ | ◎ | ◎ | ○ | ◎ | X | X | X | X | ◎ | ○ |

A-1: Polypropylene (Sumitomo Chemical's NOBLEN Y101)
A-2: High-density polyethylene (Mitsui Chemical's, HI-ZEX 2200J)
A-3: Aliphatic polyketone (Shell's CARILON P1000)

As is obvious from the results in Table 20, it is understood that the resin compositions of the invention that comprise the three components, polylactic acid resin, polyacetal resin and additional thermoplastic resin have good moldability, mechanical properties, heat resistance and surface appearance.

Example 23

Examples of the Invention and Comparative Examples

Poly-L-lactic acid resin having a D-isomer content of 1.2% and having a weight-average molecular weight measured through PMMA-calibrated gel permeation chromatography with a solvent of hexafluoroisopropanol of 160,000, polyacetal copolymer (Toray's AMILUS S761) having a melt index measured according to ASTM-D1238 at 190° C. of 9 g/10 min and having a melting point of 170° C., glass fibers (Nittobo's 3J948) and various thermoplastic resins mentioned below were mixed in the ratio as in Table 21, and kneaded in melt in a 30 mmφ twin-screw extruder at a cylinder temperature of 220° C. and a revolution of 100 rpm to obtain a resin composition.

The codes for the thermoplastic resins in Table 21 indicate the following:
A-4: Polystyrene resin (Asahi Kasei's STYLON 679).
A-5: AS resin (Asahi Kasei's STYLAC 769).
A-6: Polycarbonate resin (Mitsubishi Engineering Plastics' IUPILON H4000).

Using a differential scanning calorimeter (DSC, by Seiko Electronics) driven at a heating and cooling rate of 20° C./min, the polylactic acid resin-derived glass transition temperature (Tg) of the resin composition and the polyacetal resin-derived crystallization temperature (Tc) at cooling thereof were measured. The data are given in Table 21. The other thermoplastic resin-derived glass transition temperature, if any, of the compositions is also shown in the Table.

The resin composition was injection-molded at a cylinder temperature of 210° C. and a mold temperature of 40° C. Thus molded, the test pieces were visually checked for deformation and surface appearance. Further, the test pieces were subjected to a flexural test according to ASTM-D790. The test pieces were crystallized at 70° C. for 12 hours and again checked for deformation. For deformation, the test pieces were evaluated in four ranks. (◎ means no deformation; ○ means some deformation, which, however, could not be confirmed in visual observation; Δ means deformation that is visually seen; and X means serious deformation.) The results are all given in Table 21. The outward appearance of each sample was evaluated in four ranks as follows:

4: Seemingly not transparent but roughened little.
3: Seemingly not transparent but much roughened.
2: Roughened little, but seemingly transparent
1: Seemingly transparent and much roughened.

TABLE 21

|  |  | Examples of the Invention | | | | |
| --- | --- | --- | --- | --- | --- | --- |
|  |  | 23-1 | 23-2 | 23-3 | 23-4 | 23-5 |
| Polylactic Acid Resin | wt. pt. | 80 | 80 | 80 | 80 | 20 |
| Polyacetal | wt. pt. | 20 | 20 | 20 | 20 | 80 |
| Thermoplastic Resin | type | A-4 | A-5 | A-6 | A-4 | A-6 |
|  | wt. pt. | 20 | 20 | 20 | 60 | 20 |
| Glass Fibers | wt. pt. | 21 | 21 | 21 | 28 | 40 |
| Glass Transition Temperature | ° C. | 39, 100* | 41, 108* | 42, 142* | 39, 100* | 142* |
| Crystallization Temperature at cooling | ° C. | 124 | 125 | 124 | 125 | 138 |
| Deformation in molding |  | ◎ | ◎ | ◎ | ○ | ◎ |
| Surface Appearance |  | 4 | 4 | 4 | 3 | 4 |
| Flexural Modulus | MPa | 7080 | 7100 | 7030 | 7020 | 7030 |

TABLE 21-continued

| | | Comparative Samples | | | | | |
|---|---|---|---|---|---|---|---|
| | | 23-1 | 23-2 | 23-3 | 23-4 | 23-5 | 23-6 |
| Deformation after crystallization | | ◎ | ◎ | ◎ | ○ | | ◎ |
| Polylactic Acid Resin | wt. pt. | 100 | 100 | 100 | 100 | — | — |
| Polyacetal | wt. pt. | — | — | — | — | 100 | 100 |
| Thermoplastic Resin | type | — | A-4 | A-5 | A-6 | — | A-6 |
| | wt. pt. | — | 20 | 20 | 20 | — | 20 |
| Glass Fibers | wt. pt. | 18 | 21 | 21 | 21 | 32 | 40 |
| Glass Transition Temperature | ° C. | 62 | 61, 101* | 62, 110* | 62, 143* | — | 143* |
| Crystallization Temperature at cooling | ° C. | — | — | — | — | 140 | — |
| Deformation in molding | | X | X | Δ | Δ | ◎ | ○ |
| Surface Appearance | | 2 | 1 | 1 | 1 | 3 | 3 |
| Flexural Modulus | MPa | 6950 | 6910 | 6900 | 6870 | 7600 | 7520 |
| Deformation after crystallization | | X | X | X | X | Δ | Δ |

A-4: Polystyrene resin (Asahi Kasei's STYLON 679)
A-5: AS resin (Asahi Kasei's STYLAC 769)
A-6: Polycarbonate resin (Mitsubishi Engineering Plastics' IUPILON H4000)
*Thermoplastic resin derived Tg As is obvious from the results in Table 21, it is understood that the resin compositions of the invention that comprise the three components, polylactic acid resin, polyacetal resin and additional thermoplastic resin have good moldability, mechanical properties, heat resistance surface appearance and dimensional stability.

INDUSTRIAL APPLICABILITY

The resin composition of the invention a miscible composition having peculiar properties, and can be worked through injection molding, extrusion molding or the like into various practicable shaped articles. Its practicable moldings are injection moldings, extrusion moldings, blow moldings, films, fibers, sheets, etc. The films and sheets may be in any form of non-oriented, monoaxially oriented or biaxially oriented films or sheets. The fibers may be non-drawn fibers, drawn fibers or ultra-drawn fibers, and they may be worked into woven fabrics, knitted fabrics, nonwoven fabrics (spun-bond, melt-blow or stable), ropes or nets for practical use. When the resin composition is injection-molded, the mold temperature is preferably not lower than 30° C., more preferably not lower than 60° C., even more preferably not lower than 80° C. in view of its crystallization, but is preferably not higher than 140° C., more preferably not higher than 120° C., even more preferably not higher than 110° C. in view of the deformation of the molded pieces. These articles may be used for parts of electric and electronic appliances, construction materials, automobile parts, machine parts, daily necessaries, etc.

Concretely, they are electric and electronic parts such as relay cases, coil bobbins, optical pickup chassis, motor cases, housings and inner parts of notebook-size personal computers; housings and inner parts of CRT displays; housings and inner parts of printers; housings and inner parts of mobile terminals such as mobile phones, mobile personal computers, hand-held mobiles, etc.; housings and inner parts of recording media (CD, DVD, PD, FDD, etc.) drives; housings and inner parts of copying machines; housings and inner parts of facsimiles; parabolic antenna. In addition, they further include parts of electric and electronic appliances for household use and office use, such as typically VTR parts, TV parts, irons, hair driers, rice cooker parts, microwave range parts, acoustic parts, video cameras, parts of sound appliances including audios, LASERDISC (registered trade name), and compact discs, lighting parts, refrigerator parts, air conditioner parts, typewriter parts, word processor parts. Moreover, they are further useful as housings and inner parts of electronic musical instruments, game machines for household use, mobile game machines, etc; electric and electronic parts such as various gears, various cases, sensors, LEP lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, semiconductors, liquid-crystal appliances, FDD carriages, FDD chassis, motor brush holders, transformer parts, coil bobbins; building parts such as metal-framed glass sliding door wheels, blind curtain parts, pipe joints, curtain liners, blind parts, gas meter parts, tap water meter parts, hot-water heater parts, roof panels, heat-insulating walls, adjusters, plastic floor post, ceiling hangers, stairs, doors, floors; marine-related parts such as fishing lines, fishing nets, seaweed raising nets, fishing feed bags; civil engineering-related parts such as vegetation nets, vegetation mats, weeds-preventing bags, weeds-preventing nets, curing sheets, slope protection sheets, flying ash-retarding sheets, drain sheets, water-retaining sheets, sludge-dewatering bags, concrete forms; automobile underhood parts such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotary sensors, acceleration sensors, distributor caps, coil bases, ABS actuator cases, radiator tank tops and bottoms, cooling fans, fan shroud, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves, various pipes; automobile interior parts such as torque control levers, safety belt parts, register blades, washer levers, window regulator handles, knobs of window regulator handles, passing light levers, sun visor brackets, various motor housings; automobile exterior parts such as roof rails, fenders, garnishes, bumpers, door mirror stays, spoilers, hood louvers, wheel covers, wheel caps, grill apron cover frames, lamp reflectors, lamp bezels, door handles; various automobile connectors such as wire harness connectors, SMJ connectors, PCB connectors, door grommet connectors; machine parts such as gears, screws, springs, bearings, levers, key stems, cams, ratchets, rollers, water-supply parts, toy parts, fans, fishing guts, pipes, washing tools, motor parts, microscopes, bioscopes, cameras, watches; agricultural parts such as multi-films, tunnel films, bird-protecting films, nonwoven fabrics for protective vegetation, pots for seedlings, poles for vegetation, tapes for seeding, sheets for sprouting, inner sheets for greenhouses, stoppers for agricultural polyvinyl sheets, slow-releasing fertilizer, root-preventing nets, gardening nets, insect-preventing nets, nets for young trees, printing laminates, fertilizer bags, sample bags, sandbags, harmful animal-preventing nets, attractant cords, windshield nets; sanitary supplies such as paper diapers, wrapping and packaging materials for sanitary goods, cotton buds, damp towels, toilet seat wipers; medical supplies such as nonwoven fabrics for medical use (suture reinforcing materials, adhesion-preventing membranes, artificial organ repairing materials), wound-covering materials, wound-taping bandages, base fabrics for plasters, sutures for surgical operations, broken bone-reinforcing materials, medical films; wrapping and packaging films for calendars, stationery, clothing, food; vessels and tableware such as trays, blisters, knives, folks, spoons, tubes, plastic cans, pouches, containers, tanks, baskets; container wrapping and packaging such as hot-fill containers, containers for microwave oven cooking, containers for cosmetics, wrapping films, foamed buffers, paper laminates, shampoo bottles, drink bottles, cups, candies wrapping, shrink labels, lid materials, windowed envelops, fruits baskets, tearable tapes, easy-peel wrapping, egg packs, HDD wrapping, compost bags, recording media wrapping, shopping bags, wrapping films for electric and electronic parts; various cloths such as natural fiber composites, polo shirts, T-shirts, inners, uniforms, sweaters, socks, neckties; interior goods such as curtains, chair facing fabrics, carpets, table cloths, bedclothes texture covers, wallpapers, cloth wrappers; carrier tapes, print laminates, thermal stencil printing films, lubricant films, porous films, container bags, credit cards, cash cards, ID cards, IC cards, hot-melt binders for paper, leathers, nonwoven fabrics and others, binders for powders of magnetic materials, zinc sulfide, electrode materials and others, optical devices, electroconductive embossed tapes, IC trays, golf tees, garbage bags, shopping bags, various nets, tooth brushes, stationery, draining nets, body towels, hand towels, tea bags, drain filters, clear files, coating agents, adhesives, bags, chairs, tables, cooler boxes, rakes, hose reels, planters, hose nozzles, surfaces of dining tables and desks, furniture panels, kitchen cabinets, pen caps, gas lighters, etc.

The invention claimed is:

1. A resin composition comprising from 40 to 60 parts by weight of a polylactic acid resin and from 40 to 60 parts by weight of a polyacetal resin relative to 100 parts by weight of the total of the polylactic acid resin and the polyacetal resin, and further comprising a core/shell multi-layered polymer which is composed of a core layer and one or more shell layers that cover it and in which the neighboring layers are formed of different types of polymers; the formaldehyde content of the composition being less than 500 ppm relative to the polyacetal resin;

wherein a lactic acid component of the polylactic acid resin includes not less than 95% of an L-isomer or not less than 95% of a D-isomer, the polylactic acid resin and the polyacetal resin in the resin composition are miscible with each other, and the crystallization temperature during cooling caused by the polyacetal resin in the resin composition is lower than the crystallization temperature during cooling of the polyacetal resin alone.

2. The resin composition as claimed in claim 1, wherein the core/shell multi-layered polymer is a multi-layered polymer in which the shell layer comprises methyl methacrylate units or methyl acrylate units.

3. The resin compositon as claimed in claim 1, wherein the polyacetal resin is a polyacetal copolymer.

4. A molding of the resin composition of claim 1.

5. A film of the resin composition of claim 1.

6. A fiber of the resin composition of claim 1.

7. The resin composition as claimed in claim 1, wherein at least one terminal blocking agent having reactivity with carboxyl groups and selected from the group consisting of epoxy compounds and carbodiimide compounds is melt kneaded into said resin composition.

8. A resin composition comprising from 1 part by weight to less than 40 parts by weight of a polylactic acid resin and more than 60 parts by weight to 99 parts by weight of a polyacetal resin relative to 100 parts by weight of the total of the polylactic acid resin and the polyacetal resin, and further comprising a core/shell multi-layered polymer which is composed of a core layer and one or more shell layers that cover it and in which the neighboring layers are formed of different types of polymers;

wherein a lactic acid component of the polylactic acid resin includes not less than 95% of an L-isomer or not less than 95% of a D-isomer, the polylactic acid resin and the polyacetal resin in the resin composition are miscible with each other, and the crystallization temperature during cooling caused by the polyacetal resin in the resin composition is lower than the crystallization temperature during cooling of the polyacetal resin alone.

9. The resin composition as claimed in claim 8, wherein the core/shell multi-layered polymer is a multi-layered polymer in which the shell layer comprises methyl methacrylate units or methyl acrylate units.

10. The resin composition as claimed in claim 8, of which the formaldehyde content is less than 500 ppm relative to the polyacetal resin.

11. The resin composition as claimed in claim 8, wherein the polyacetal resin is a polyacetal copolymer.

12. A molding of the resin composition of claim 8.

13. A film of the resin composition of claim 8.

14. A fiber of the resin composition of claim 8.

15. The resin composition as claimed in claim 8, wherein at least one terminal blocking agent having reactivity with carboxyl groups and selected from the group consisting of epoxy compounds and carbodiimide compounds is melt kneaded into said resin composition.

* * * * *